US008506387B2

(12) United States Patent
Brosnan et al.

(10) Patent No.: US 8,506,387 B2
(45) Date of Patent: Aug. 13, 2013

(54) MULTIPLE MONETARY TYPE GAMING MACHINE WITH CASH CONVERSION FUNCTIONALITY

(75) Inventors: William R. Brosnan, Reno, NV (US); Bryan D. Wolf, Reno, NV (US); Stephen W. Morro, Reno, NV (US); Terrence Lee McCreary, Jr., Reno, NV (US); M. Ali Saffari, Reno, NV (US); John W. Chamberlain, Carson City, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 13/340,493

(22) Filed: Dec. 29, 2011

(65) Prior Publication Data

US 2012/0094748 A1 Apr. 19, 2012

Related U.S. Application Data

(62) Division of application No. 11/844,526, filed on Aug. 24, 2007.

(51) Int. Cl.
*A63F 9/24* (2006.01)
*A63F 13/00* (2006.01)

(52) U.S. Cl.
USPC .................... 463/25; 436/16; 436/20; 436/42

(58) Field of Classification Search
USPC ...................................... 463/1, 16, 20, 25, 42
See application file for complete search history.

(56) References Cited

U.S. PATENT DOCUMENTS 4,953,086 A * 8/1990 Fukatsu .......................... 705/42
5,470,079 A * 11/1995 LeStrange et al. .............. 463/25
5,516,104 A 5/1996 Takemoto et al.
5,813,510 A * 9/1998 Rademacher ................. 194/206
5,895,456 A * 4/1999 Beale et al. ..................... 705/39
6,416,413 B1 7/2002 Yoo (Continued)

FOREIGN PATENT DOCUMENTS

DE 38 34 020 A1 6/1989
GB 2 144 567 A 3/1985
WO 94/16781 8/1994
WO 96/08795 A 3/1996

OTHER PUBLICATIONS

International Search Report dated Nov. 7, 2008 for PCT Application No. PCT/US2008/071582.
Written Opinion dated Nov. 7, 2008 for PCT Application No. PCT/US2008/071582.
Office Action dated Sep. 20, 2011 issued in U.S. Appl. No. 11/844,526.

(Continued)

*Primary Examiner* — Milap Shah
*Assistant Examiner* — Lawrence Galka
(74) *Attorney, Agent, or Firm* — Foley & Lardner LLP

(57) ABSTRACT

A gaming machine connected in a gaming network or operating as a stand-alone machine, is capable of accepting two or more currencies for wager game play. The machine operates internally using a native monetary type and converts non-monetary bills to native amounts in the form of restricted or cashable credits. The multiple currency capability of the machine is utilized to encourage the use of restricted credits by adjusting conversion rates, payback tables, and the like. These features, combined with the use of restricted credits, also enable ways to monitor abuse and illegal activity on the gaming machine and implement ways to limit losses by a player. Certain post-conversion processes are used to ensure that the player is returned non-converted amounts. The gaming machine has additional hard and soft meters to process multiple monetary types.

14 Claims, 19 Drawing Sheets

(56) References Cited

U.S. PATENT DOCUMENTS

| | | | | |
|---|---|---|---|---|
| 6,682,421 | B1 | 1/2004 | Rowe et al. | |
| 7,063,617 | B2 | 6/2006 | Brosnan et al. | |
| 2001/0041610 | A1* | 11/2001 | Luciano et al. | 463/16 |
| 2002/0195309 | A1* | 12/2002 | Pope | 194/217 |
| 2005/0003893 | A1 | 1/2005 | Hogwood et al. | |
| 2005/0209004 | A1* | 9/2005 | Torango | 463/42 |
| 2008/0085753 | A1* | 4/2008 | Okada | 463/20 |
| 2009/0054149 | A1 | 2/2009 | Brosnan et al. | |

OTHER PUBLICATIONS

U.S. Notice of Allowance dated Nov. 19, 2012 in U.S. Appl. No. 11/844,526.

GB Examination Report dated Nov. 5, 2012 in GB Appl. No. 0916751.1

GB Examination Report dated Dec. 21, 2012 in GB Appl. No. 0916751.1.

* cited by examiner

FIG. 5

MONETARY TYPE TABLE
502

| NAME | US |
|---|---|
| COUNTRY CODE | 0x00 |
| BASE DENOMINATION | CENT, PLURAL IS CENTS |
| WHOLE DENOMINATION | DOLLAR, PLURAL IS DOLLARS |
| HOW TO DISPLAY IN BASE UNITS | "XXX,XXX,XXX.XXXc" |
| HOW TO DISPLAY IN WHOLE UNITS | "$XXX,XXX,XXX.XX" |

504

DENOMINATIONS

| NAME | VALUE | PHYSICAL TYPE |
|---|---|---|
| CENT | 1 | COIN |
| NICKEL | 5 | COIN |
| DIME | 10 | COIN |
| QUARTER | 25 | COIN |
| ⋮ | ⋮ | ⋮ |
| FIVE DOLLAR | 500 | BILL |
| TEN DOLLAR | 1000 | BILL |
| ⋮ | ⋮ | ⋮ |

506

MULTIPLE MONETARY TYPE GAMING MACHINE WITH CASH CONVERSION FUNCTIONALITY

CROSS-REFERENCE TO RELATED PATENT APPLICATIONS

This application is a divisional application of co-pending U.S. patent application Ser. No. 11/844,526, filed on Aug. 24, 2007, entitled "MULTIPLE MONETARY TYPE GAMING MACHINE WITH CASH CONVERSION FUNCTIONALITY," which is incorporated herein by reference in its entirety for all purposes.

BACKGROUND OF THE INVENTION

This invention relates to game playing services for gaming machines such as slot machines and video poker machines. More particularly, the present invention relates to systems and methods enabling able wins of restricted credit on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ PAY ticket system by International Game Technology of Reno, Nev. Award ticket systems and systems using other cashless mediums are referred to as cashless systems.

Cashless systems, such as the EZ PAY ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system. Currently, cashless systems have become very popular and have been embraced by customers. For example, ticket vouchers that are generated upon cash-out and redeemed for cash or gaming machine credits within a particular casino are well accepted by game players.

Many gaming systems support player credits more than one type. "Cashable" credits are redeemable for cash for the full face value of the cashless gaming instrument (e.g., ticket or voucher). "Restricted" credits are not directly redeemable for cash for the full face value of the cashless gaming instrument. Restricted credits may be, for example, non-cashable, that is, not redeemable for cash, but only playable on a gaming machine that supports the cashless system in which the instrument (voucher) was issued. Other examples of restricted credits are credits that are redeemable for prizes, or for cash at a discount from the instrument's face value. Restricted credit vouchers are sometimes issued to players in a casino as an incentive to further play, for example. Currently, restricted credit is only available via electronic funds transfer (EFT) or as promotional vouchers and gaming machines have a fixed payout schedule (pay table) that generates cashable credits from winning game play.

Thus, as players play a gaming machine, they win cash, cashable credits or prizes based on a fixed payout schedule. Players may typically collect their credits won as cash at any time between games. Some host systems to which gaming machines are connected are capable of giving players restricted credits on a gaming machine via an electronic funds transfer (EFT). Also, as noted above, a casino operator may manually issue restricted credit vouchers (commonly known as promotional credits) to a player. Typically, these non-cashable restricted credits that players must play on compatible gaming machines and cannot collect as cash. As players wager this type of credit, the gaming machine typically awards cashable credits for wins.

In some cases, a machine may issue free games or plays, however, such free games are not credits and are limited to play on the issuing machine during the current playing session.

Further, a gaming operator may have gaming machines in several countries. In each country, the gaming machine is configured to accept currency of the local monetary type, essentially a single country's legal tender. A single machine may be able to accept bills of currency A and pay out in bills of currency B, or vice versa. There is no local or "native" monetary type. Nor are there provisions for paying out in the form of restricted credits in either currency A or currency B. Since there is no local monetary type, exchange rates between the currencies cannot be effectively used to further encourage the use of restricted credits. The use of restricted credits and ways of obtaining them through cash in amounts or through game wins are limited to gaming machines that accept currency of only one monetary type. Given the benefits of restricted credits to a casino and to players, it would be desirable to expand the ways these types of credits can be obtained by a player and to offer further financial incentives for players to want to obtain restricted credits from their cash in amounts. It would also be desirable for a gaming operator to be able to leverage the use of restricted credits for other purposes that go beyond their use as a promotional feature utilized by the gaming operator on its gaming machines.

SUMMARY OF THE INVENTION

This invention addresses the needs indicated above by providing a gaming machine, system, and methods designed or configured to allow a gaming machine to accept two or more different types of currency as a cash in amount for wagering by performing cash conversion processes within the gaming machine and/or gaming system. A player can insert bills of a foreign or "non-native" currency into a gaming machine (operating with a single native currency) to obtain native credits for wager game play on the machine, the credits being either cashable or restricted (promotional) type credits. The gaming machine or gaming system utilizes different exchange rates for converting the non-native cash in amount to a native amount depending on various factors, such as the type of credits the player is requesting (e.g., a higher exchange rate may apply if requesting restricted credits), the status of the player (higher exchange rates for loyalty program players or VIP players), among other factors.

In particular embodiments, the gaming machine may utilize a bill validator and associated firmware that accepts non-native bills and holds them in a temporary state or in escrow until the bills are scanned, validated, and valued. All bills entered in a single input sequence may be held in escrow until a total value is determined and conversion operations are completed. Methods used for converting a non-native amount to a native amount take into account unconverted amounts (remaining amounts of the non-native cash that could not be converted into a meaningful native amount) and non-returnable amounts (portions of the remaining amounts that could not be returned to the player). Restricted credits are used or leveraged in various ways, one of which is to ensure that the player obtains a more favorable conversion rate and that any non-returnable amounts are minimized. They are also used to limit potential abuse and illegal activity of multi-currency gaming machines so that they are not used, for example, for money laundering or to evade banking and cash import/export regulations. That is, restricted credits may be used to discourage the use of gaming machines as mere cash conversion kiosks. In another embodiment, the use of restricted credits, together with the gaming operator's ability to adjust conversion rates, allow for new ways to implement loss limits for specific players and other harm minimization policies.

In one embodiment, a gaming machine accepts a native currency and a non-native currency for wager game play, wherein payouts are made in the native currency. The gaming machine may use a currency conversion module for currency conversions from a non-native monetary type value to the machine's native monetary type. The conversion rate used may depend on factors such as whether the player requested cashable or restricted credits. An operator interface module may provide interfaces and menus related to currency conversion for use by a gaming operator to manage currency conversion features on the gaming machine. In one embodiment, these interfaces may include a currency type menu and an exchange rate interface. A gaming machine capable of performing these functions may require storing and accessing certain types of data. For example, one category of data is exchange rate information used for converting non-native cash in amounts to native cash in amounts. There may be several different exchange rates used depending on the situation and the status of the player. Another category of data is monetary type information which for providing basic information on a specific monetary type such as format, base units, denominations, and so on. A gaming machine may store such data in the form of a table and have one or more tables for each monetary type supported by the machine. The gaming machine has additional hard and soft meters for processing the monetary types. In one embodiment, a hard meter for non-native cash in is used to keep a count of the foreign currency inserted in the machine. There may also be non-native currency soft meters for lifetime cash in and periodic cash in. In another embodiment, the soft meters may also include separate meters for specific non-native denominations. In another embodiment, the gaming machine may include a display configuration module for displaying symbols, text, and other indicia of foreign currencies on the gaming machine user interface.

In another embodiment, a method of accepting two monetary types in a gaming machines to enable game play and payouts in one of the monetary types includes scanning a bill and ascertaining the monetary type of the bill. In one embodiment, the scanning mechanism, such as a bill validator, holds the bill in a temporary state. The bill is released from the temporary state in the scanning mechanism if the gaming machine is configured to process the monetary type of the bill. If it is determined that the bill of a non-native monetary type, the value of the bill is converted to a to native value using a valid exchange rate between the non-native monetary type and a native monetary type. In one embodiment, the valid exchange rate varies depending on the selected native credit type desired by the player. After conversion is performed, there may be an unconverted non-native value that could not be converted due to base units, denominations, and other information stored in the monetary type table of the non-native currency and the minimum wager (bet) amount of the gaming machine. In one embodiment, a certain amount of the unconverted value, possibly all of it, may be returned to the player. If an amount can not be returned because of limitations of the gaming machine or because of characteristics of the monetary type, in one embodiment, this amount is stored on the machine. After the non-native amount is converted, one or more meters in the gaming machine are updated with the native value, at which stage wager game play in the gaming machine may begin.

Another aspect of the invention pertains to computer program products, including tangible, machine-readable medium, including various forms and implementations of volatile and non-volatile memory, on which are stored program instructions for implementing any of the methods described herein. Any of the methods, processes, sub-processes, threads, formulas, calculations, and the like of this invention may be represented as program instructions and/or databases, data structures, data tables, and so on that can be provided on such computer readable media.

These and other features and advantages of the present invention are described below with reference to the drawings.

BRIEF DESCRIPTION OF THE DRAWINGS

FIG. 5 is a block diagram of a monetary type table showing various characteristics and features of a monetary type as may be utilized in a gaming machine of the present invention.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Gaming Machines and Systems

Figure 1:
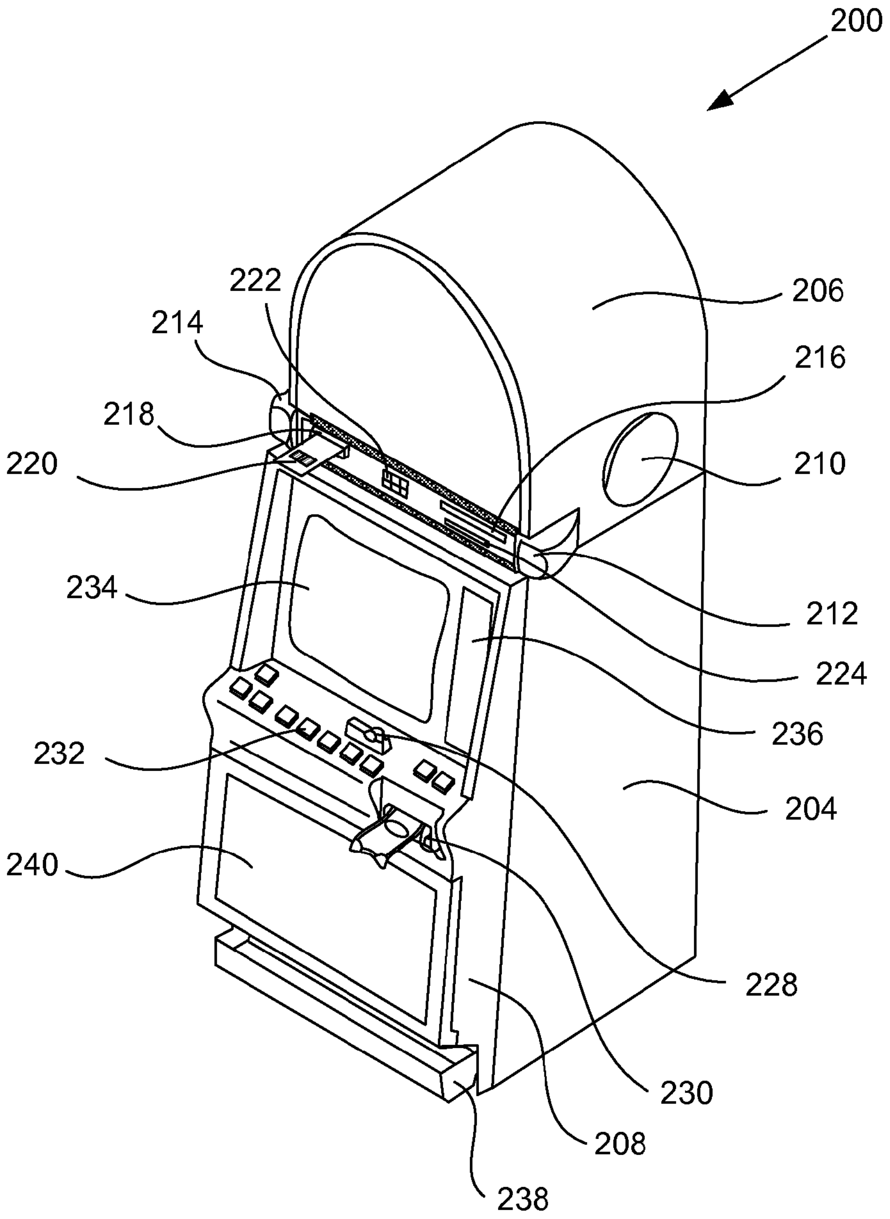
FIG. 1 is a perspective drawing of a gaming machine having a top box and other devices.

FIG. 1 illustrates a video gaming machine 200 suitable for implementation of the present invention. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 1, when a user wishes to play the gaming machine 200, he or she inserts cash or cash tokens through the coin acceptor 228 or bill validator 230. In addition, the player may use a cashless instrument of some type to register credits on the gaming machine 200. For example, the bill validator 230 may accept a printed cashable, restricted (e.g., non-cashable) or combination ticket voucher, including 220, as an indicia of credit. The credits are preferably, but not necessarily, accounted for in the lowest common denominator of the currency accepted by the gaming machine (e.g., pennies for US dollars). As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location, 7) a ticket owner, and 8) a ticket type (e.g., cashable, restricted or combination). Information such as the ticket type, ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200. The promotional prize may involve multiple properties and particular types of gaming machines and/or host systems.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 220, may be printed from a printer, including printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM-like terminals, at a cashier station when a player cashes out or prepaid smart cards or debits may be purchased within the gaming property (e.g. casino). Smart cards may distinguish between types of stored credit (e.g., cashable vs. restricted), and may carry credit information for multiple types of credit at the same time.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a cash prize where the ticket is cashable. Further, the player may receive a ticket 220 for food, merchandise, game services or other promotions from the printer 218 that may be used at the gaming property where the gaming machine is located or at other gaming properties. The player may view cashless instrument transaction information on the video display screen 234 or the florescent screen 216. For instance, when a player cashes out from the gaming machine, the value stored on the cashless instrument may be displayed using the video display 234. The gaming machine may display to the player the number of restricted credits separately or as a sum with cashable credits.

Figure 2:
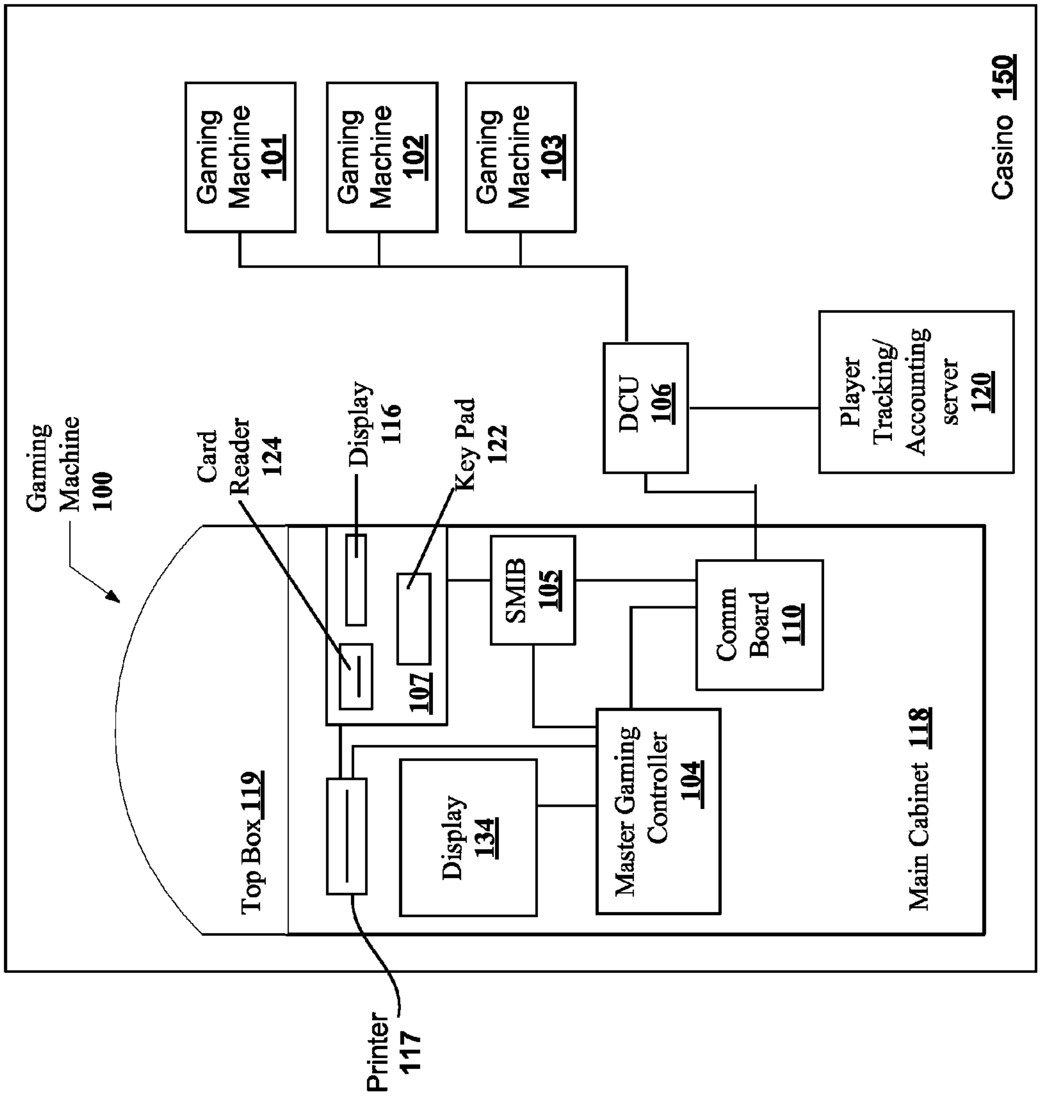
FIG. 2 is a block diagram of a number of gaming machines connected to servers providing associated services, such as accounting and player tracking.

A gaming machine in accordance with the present invention is further described with reference to FIG. 2. FIG. 2 is a block diagram of a number of gaming machines connected to servers providing associated services, such as accounting and player tracking. In casino 150, gaming machines 100, 101, 102 and 103 are connected, via the data collection unit (DCU) 106 to the player tracking/accounting server 120. The DCU 106, which may be connected to up to 132 player tracking units as part of a local network in a particular example, consolidates the information gathered from player tracking units in gaming machines 100, 101, 102 and 103 and forwards the information to the player tracking/accounting server 120. Among the functions of the player tracking/accounting server are 1) to store player tracking account information, such as information regarding a player's previous game play, and 2) to calculate player tracking points based on a player's game play that may be used as basis for providing rewards to the player. Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes.

In gaming machine 100 of casino 150, an intelligent device, such as a master gaming controller 104, controls various combinations of devices that allow a player to play a game on the gaming machine and also encourage game play on the gaming machine, etc. The present invention may be implemented in logic used in the design and/or configuration of a gaming machine, including a master gaming controller (or other intelligent device in a gaming machine network such as a host server, CVT, etc.), to enable a gaming machine to accomplish the functions required by the invention including distinguishing between and handling different credit types during cash in, play (wagering and wins) and cash out phases of a gaming session, and implementing a pay schedule to determine restricted winnings, as described further below with reference to FIG. 4. The logic may be stored in a memory in the gaming machine, connected with the master gaming controller 104 or other intelligent device.

The gaming machine 100 may display to the player the number of restricted credits separately or as a sum with other types of credit during a gaming session via one or more display devices and methods. The credit and credit type information may be presented to the player in a variety of ways that are meaningful in relation to their wagering. For example, the values may be expressed as cash (in one or more currency denominations) instead of, or in addition to, credits. In such an embodiment, the cash value of restricted credits may be displayed as having one value for wagering and a different value (or none at all, depending on the type of restricted credit) for cash out. The application of a wager, including the credit composition of the wager, is controlled by logic of the individual machine and/or, where the machine is connected to a system, the host.

The master gaming controller 104 is connected with a main, usually video, display 108, and with the machine's other gaming devices which are mounted within a main cabinet 118 of the gaming machine 100. A player tracking unit 107 may be connected to the master gaming controller 104 via a slot machine interface board (SMIB) 105. The machine 100 also includes a ticket printer 117 connected to the master gaming controller 104 and/or the player tracking unit 107 as a peripheral device. The printer may print bar-coded tickets or vouchers, etc. A top box 119 is mounted on top of the main cabinet 118 of the gaming machine. In many types of gaming machines, the player tracking unit is mounted within the top box 119. Communication between the master gaming controller and the machine's various gaming devices and the a host system is via a main communication board 110.

A typical player tracking unit 107 includes a variety of player tracking devices, such as a card reader 124, a key pad 122, and a display 116, usually fluorescent, all mounted within the unit. Of course, other player tracking devices may also be used. The player tracking devices are used to input player tracking information that is needed to implement the player tracking program. The player tracking unit 107 communicates with the player tracking server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking application(s) running on a host system including server 120 to calculate player tracking points for the player. The player tracking unit 107 is usually connected to the master gaming controller 104 via a serial connection of some type and communicates with the master gaming controller 104 using a communication protocol(s) of some type. For example, the master gaming controller 104 may employ the Slot Accounting System (SAS protocol) developed by International Game Technology of Reno, Nev. to communicate with the player tracking unit 107. SAS can operate with multiple channels to communicate with other systems such as IGT's EZ PAY servers or CVTs, etc.

Figure 3:
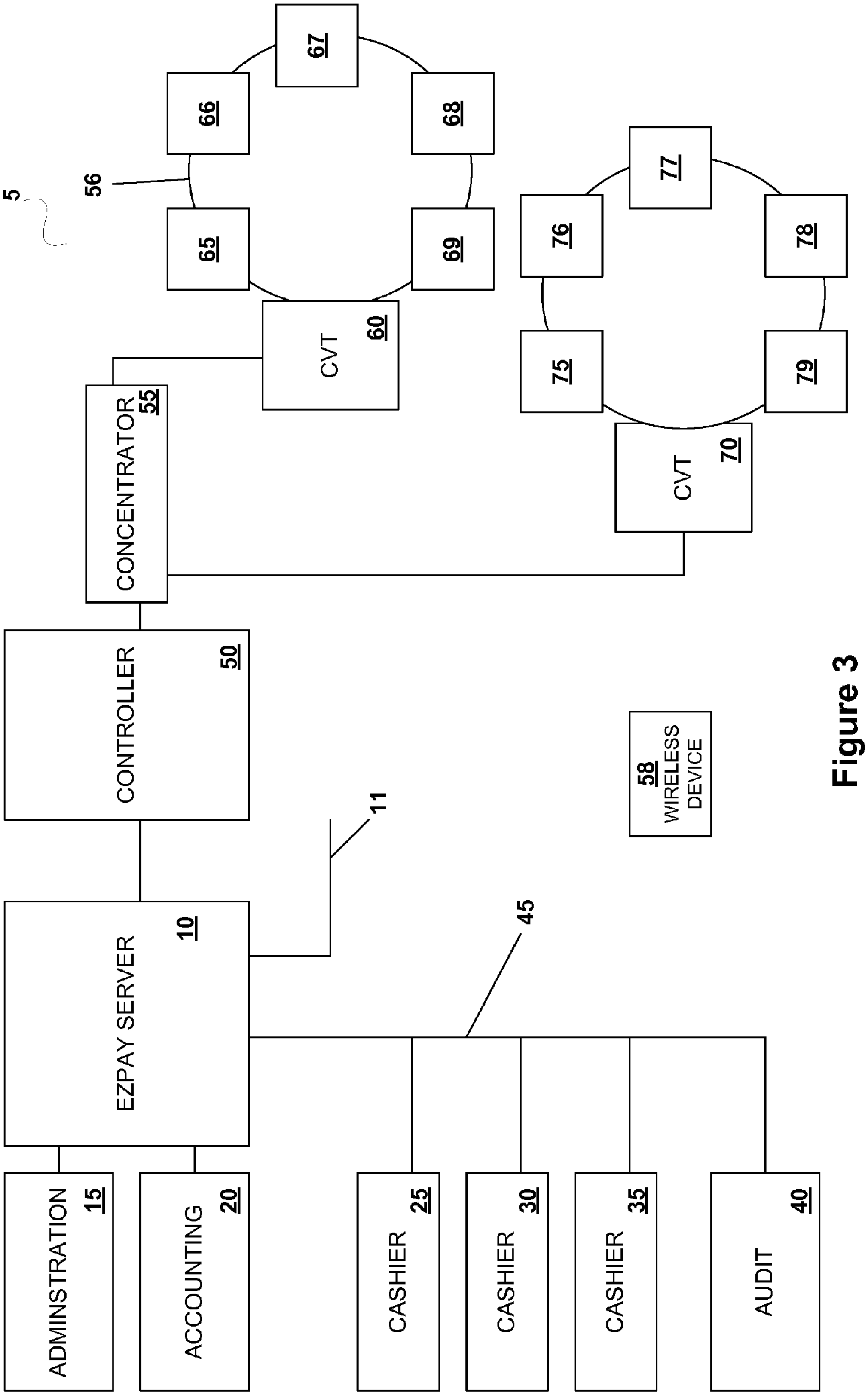
FIG. 3 is a block diagram of the components of a cashless system using the EZ PAY ticket voucher system.

FIG. 3 is a block diagram of the components of a cashless gaming system, such as the EZ PAY ticket voucher system (IGT, Reno, Nev.), suitable for implementation of the present invention. A cashless system is the hardware components and software components needed to generate and validate cashless instruments. Components of an cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ PAY ticket voucher system. Typically, a cashless system is installed at each property utilizing cashless instruments. To allow multi-site validations of cashless instruments, the cashless systems at each property may be linked to a cashless instrument transaction clearinghouse, such as described in co-pending U.S. patent application Ser. No. 09/648,382, filed Aug. 25, 2000, by Rowe, titled "Cashless Transaction Clearinghouse," which is incorporated herein in its entirety and for all purposes. The details of a cashless system at one property are described below with reference to FIG. 3.

Returning to FIG. 3, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. All of the gaming machines print ticket vouchers which may be exchanged for cash or accepted as credit of indicia in other gaming machine located within the property 5. In this example, the ticket voucher serves as a cashless instrument. In addition, the gaming machines may accept ticket vouchers issued at a different property from property 5 where the different property utilizes a compatible cashless system.

When the CVTs are not connected to one another, a ticket voucher printed from one gaming machine may be only be used as indicia of credit in another gaming machine which is in a group of gaming machines connected to the same clerk validation terminal. For example, a ticket voucher printed from gaming machine 65 might be used as credit of indicia in gaming machines 66, 67, 68 and 69, which are each connected to the CVT 60, but not in gaming machines 75, 76, 77, 78, and 79, which are each connected to the CVT 70. In an analogous manner, when the cashless systems from one property are not connected together then a ticket vouchers generated from gaming machine 66 may be not be used at property different from property 5.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also be stored within each gaming machine or one gaming machine may functionally act as a CVT for a group of gaming machines eliminating the separate CVT hardware. In addition, cashless instrument transaction information may be stored in a cashless server including the server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In this embodiment, when a player wishes to cash out a ticket, the player may redeem vouchers printed from a particular gaming machine at the CVT associated with the gaming machine or any other CVT which is part of the cashless system associated with the CVT. For example, since CVT 60 and CVT 70 are connected as part of a single cashless system to the server 10, a player may redeem vouchers or utilize vouchers at the gaming machines, the CVT's (60 or 70), the cashiers (25, 30, 35, and 40) or the wireless cashiers 58. The CVTs, cashiers, wireless cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

The topology of such cashless gaming systems may vary dramatically depending on implementation, but the primary functions are similar. For example, not all cashless systems may utilize CVTs. Many of the functions of the CVT may be transferred to a cashless gaming system server, including the server 10, eliminating the function within the CVT. For instance, the cashless instrument transaction information may be stored in the cashless server instead of the CVT. Thus, the need to store cashless instrument transaction information within the CVT may be eliminated.

In this embodiment of a cashless system, multiple groups of gaming machines connected to CVTs are connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to a server 10 which may provide a variety of information services for the award ticket system including accounting 20 and administration 15.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device for validating ticket vouchers. A more complete discussion of the details of the wireless gaming device 58, including hardware and utilization, are described in copending U.S. patent application Ser. No. 09/544,844 entitled "A Wireless Game Environment" filed Apr. 7, 2000 by Rowe the entire specification of which is incorporated herein by reference.

As tickets are validated, this information may be sent to audit services computer 40 providing audit services, the accounting computer 20 providing accounting services or the administration computer 15 providing administration services. In another embodiment, all of these services may be provided by the cashless server including the EZ PAY server 10. Examples of auditing services, which may be provided by cashless system software residing on the auditing computer 40 include 1) session reconciliation reports, 2) soft count reports, 3) soft count verification reports, 4) soft count exception reports, 5) machine ticket status reports and 5) security access report. Examples of accounting services, which may be provided by cashless system software residing on the accounting computer 20 include 1) ticket issuance reports, 2) ticket liability reports, expired ticket reports, 3) expired ticket paid reports and 4) ticket redemption reports. Examples of administration services, which may be provided by cashless system software residing on the administration computer 15 include 1) manual ticket receipt, 2) manual ticket report, 3) ticket validation report, 4) interim validation report, 5) validation window closer report, 6) voided ticket receipt and 7) voided ticket report.

Restricted Wins

The present invention provides a gaming system and method enabling wins of restricted credits, supplementing current gaming systems and methods which generate cashable credits from winning game play. As used herein, the terms "cashable" and restricted have their current normal and accepted meaning in the gaming industry: "Cashable" credits are directly redeemable for cash for the full face value of the cashless gaming instrument (e.g., ticket or voucher). "Restricted" credits have restrictions applied and are not directly redeemable for cash for the full face value of the cashless gaming instrument. Restricted credits may be, for example, non-cashable, that is, not redeemable for cash, but only playable on a gaming machine that supports the cashless system in which the instrument (voucher) was issued. Such restricted credits are commonly referred to as "promotional credits." There are also other types of restricted credits, as discussed above. A "win" is an award of credits based on the outcome of a wagering game.

Figure 4:
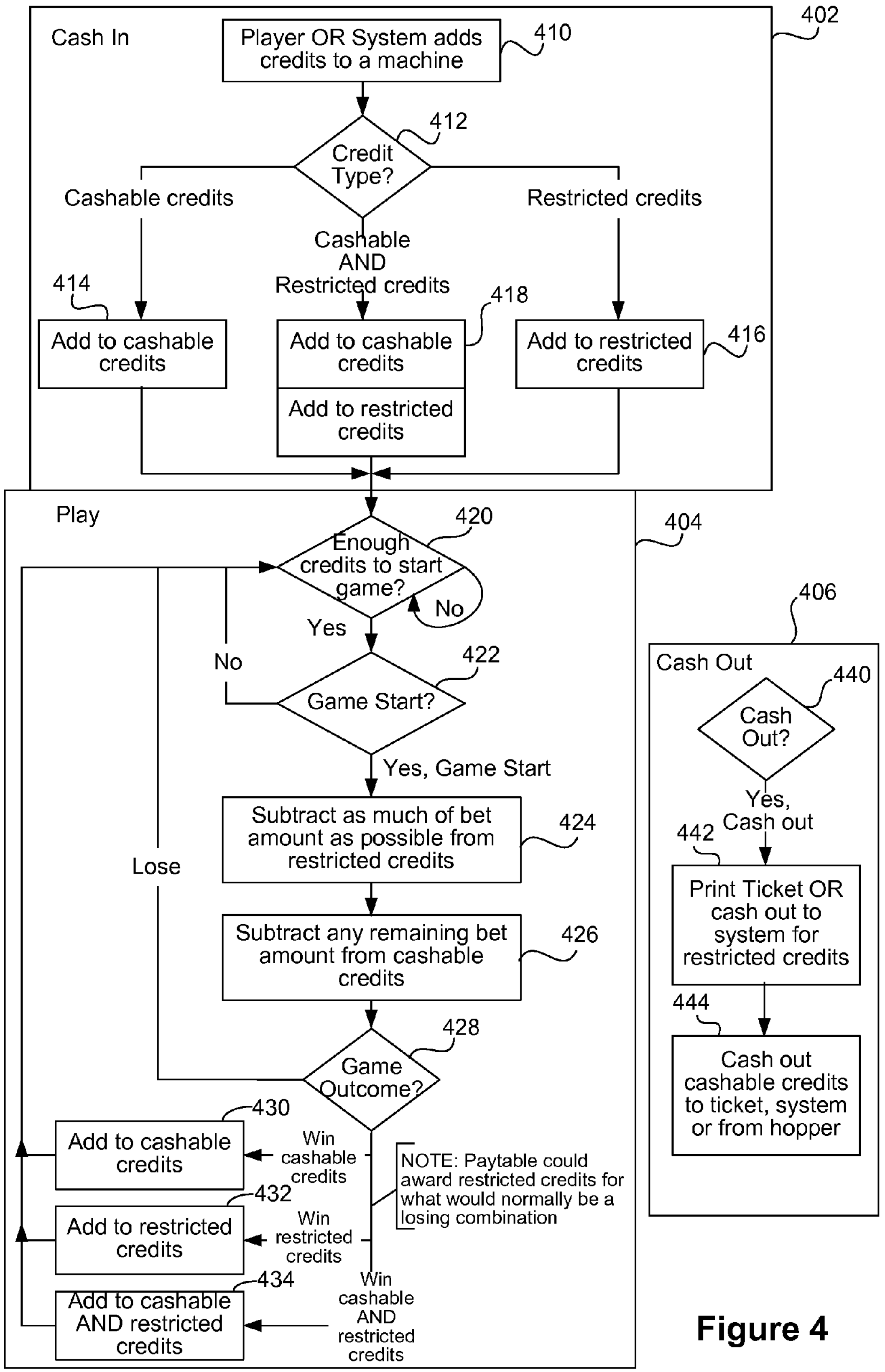
FIG. 4 is a flow chart depicting a method of providing wins of restricted credits in accordance with the present invention.

FIG. 4 is a flow chart depicting a method of providing wins of restricted credits in accordance with the present invention. The flow chart 400 is depicted as three loosely coupled threads, Cash In 402, Play 404, and Cash Out 406, each representing a distinct phase of a gaming session. In each of these threads, credit handling is required. A playing session is initiated on a machine by adding playing credit to the machine in the Cash In thread 402. In 410, credit may be added by the player adding credits to the machine in any form accepted by the machine, for example, bills, coins or vouchers. Credit may be added via an input mechanism designed or configured to receive player credit instruments, and distinguish and store player credit type and amount. In addition, the gaming machine or system may add credits to the machine for the player, for example, as a promotion. Thus, the invention allows a gaming machine operator to obtain the benefits of offering restricted credits without the need for the gaming machine to be connected to a host system (capable of EFT).

At 412, the type of credit added to the machine is determined. The credit type may be determined by the device accepting the credit. In one embodiment, a bill validator accepting a ticket or voucher is designed or configured (e.g., through logic stored in a memory associated with the device) to recognize a code indicating credit type printed or otherwise stored on the ticket or voucher. Other devices accepting credit can be designed or configured to function in this way, for example, coin acceptors may recognize tokens with no cash value but worth restricted credits when inserted into the machine. Alternatively, a host system may provide credits to a machine via EFT, indicating the type of credit provided. Credit types include cashable credits, restricted credits (of one or more types), and a combination of the cashable and restricted credits. At 414, 416 and 418, the added credits are summed with any pre-existing player credits in the machine according to type.

The gaming machine may display to the player the number of restricted credits separately or as a sum with other types of credit during a gaming session via one or more display devices and methods. The credit and credit type information may be presented to the player in a variety of ways that are meaningful in relation to their wagering or cash out options.

For example, the values may be expressed as cash (in one or more currency denominations) instead of, or in addition to, credits. In such an embodiment, the cash value of restricted credits may be displayed as having one value for wagering and a different value (e.g., a discount of the face value), or none at all, depending on the type of restricted credit, for cash out. In some embodiments, the player may be presented with cash out options for their restricted credits that include the purchase of merchandise which is displayed on the machine, or the conversion of their restricted credits to cashable credits (e.g., at a discount of the face value).

From the Cash In thread 402, the payer has a choice of playing or cashing out. If the player chooses to play, credit handling is governed by the Play (including wagering and wins) thread 404. At 420, it is determined whether or not their are enough credits in the machine to start a game. Part of starting the game is making a wager, and the player must have sufficient credit in the machine to cover a wager made. If not, game playing cannot begin without the addition of further credits or reduction of the wager to a valid amount, that it, an amount covered by the available credits. The machine will wait until further credits are added or a valid amount is wagered, or the gaming session is terminated, for example, by a cash out event. It should be understood that a player may cash out at any point before or between games, such as by pushing a cash out button on the gaming machine.

If there are enough credits to start a game, it is determined whether or not the player has started the game at 422. If the player has started a game, including making a wager, the wagered amount possible is subtracted from the player's credit total. In one embodiment, depicted in FIG. 4, as much of the wagered amount as possible is subtracted from the player's restricted credit total at 424. Any remaining wagered amount beyond that available from restricted credits is subtracted from the player's cashable credits at 426. Alternate selection of credit type for wagering may also be allowed. The application of a wager, including the credit composition of the wager, is controlled by logic of the individual machine and/or, where the machine is connected to a system, the host.

The game is then played and the outcome determined at 428. If the game outcome is a loss, the flow returns to 420 to determine if there are enough credits to start another game. If the game outcome is a win, payout schedules can specify win combinations that result in wins of cashable credits, restricted credits or a mixture of different types of credits. In each case, the wins are added to the corresponding credit types at 430, 432 and 434, and the flow returns to 420 to determine if there are enough credits to start another game.

In accordance with the present invention, payout schedules that result in wins of restricted credits can be based on a variety of factors including game plays and outcomes that might otherwise be losses or have no impact on winnings Examples of restricted credit pay schedule factors include amount wagered, winning streaks, losing streaks, time played, host system input, near misses, or any number of other methods. Once restricted credits are awarded to a player, the gaming machine will use these wins of restricted credits towards additional wagers made by the player. The gaming machine will not allow a player to directly redeem restricted credits as cash. However, depending upon the type of restricted credits a player has, the player may redeem the credits for cash at a discount value, for example, or transfer restricted credits from one machine to another via EFT (i.e., through a system cash out) or with a printed ticket or restricted credit tokens dispensed by the machine, provided the host system connected to the gaming machine supports this type of credit transfer.

Restricted credits may also be paid based on a game pay table when certain conditions are met. For example, a player may be offered a bonus (e.g., each win is enhanced by an extra 10% payout of restricted credits) for using a player tracking or loyalty system.

As noted, the Cash Out thread 406 may be invoked at any point before or between games, such as by the player pushing a cash out button on the gaming machine. Determination of whether a cash out has been requested is made at 440. If so, cash out may occur in a variety of ways. For restricted credits, a ticket or voucher may be printed by the machine with the amount of credits in the machine at the time at 442. To accomplish this, a memory storing logic may cause the master gaming controller (or other intelligent device) to award a voucher with wins of restricted credit to the player based on the game outcome. The voucher may be dispensed via an output mechanism designed or configured to store restricted credit winning information to a restricted credit instrument. Alternatively, where the player is registered with the system there may be a cash out (via EFT) to the gaming machine system with the restricted credits going into the players restricted credit account. Similarly, where the credits in the machine include cashable credits, they may be cashed out by printing to a ticket or voucher, to the system or by a dispensation of cash from the hopper, at 444. The machine may also print vouchers that represent more than one type of credit (e.g., restricted and cashable) on the same instrument. A single cash out operation may direct restricted and cashable credits to different output devices (e.g., restricted to printer to generate a voucher and cashable to hopper to dispense cash. Of course, other cash-out devices, as are known in the art, may also be used. It should also be understood that the invention may be implemented on a machine with no cash out devices where, for example, wins are provided in the form of restricted credit vouchers.

Restricted credit wins may be awarded according to the same or a different pay table as cashable credits on the same machine or at the same gaming property. Where separate pay tables are used for restricted and cashable credits, the invention may be implemented with a machine that pays restricted credits according to an evaluation mechanism associated with one fixed internal pay table and cashable credits according to another fixed internal pay table. Alternatively, a machine may pay restricted credit wins according to an external pay table provided by a host system to which the machine is connected having an evaluation mechanism that pays wins based on other factors, such as overall winning percentage at all machines on a system, player loyalty, chance bonus, loss streak, close, or other host system direction (i.e., the host system determines the game outcome and passes the result to the machine).

In one embodiment of the present invention, wins may be paid out according to a pay table or tables capable of paying out different amounts of credits depending on if paid in cashable or restricted credits. That is, for example, wins may be determined according to a different payout schedule where they are paid out in restricted credits (all or in part) rather than cashable credits. So, for example, a pay table with different winning odds may be used for awarding wins of restricted credits. Or restricted credit may be awarded from a subset of win categories (e.g., having higher odds) of a given pay table also used to award cashable wins (e.g., award cashable credits for wins for royal flush, but restricted credits for wins for a pair). The latter may have the effect of giving better odds while reducing the chance of earlier player cash outs. The restricted credit win pay schedule may give the player higher odds of winning, since according to the statistical averages used to compute pay tables, the amount of cashable credits ultimately likely to be won from wagers of restricted credits are less than the equivalent cash value of the restricted credits. In this way, the invention allows for pay schedules that can return a higher percentage to the player (where the wins include at least in part restricted credits), thereby encouraging further play, without increasing the financial liability for the gaming machine operator.

Some further examples of ways in which restricted wins may be paid out in accordance with this invention include paying a percentage cashable wins as extra wins of restricted credit, consolation prizes for extended losses, particular win categories, rewards for player loyalty or duration of play, progressive awards, or system-wide bonuses.

The preceding contemplates a gaming machine which accepts both cashable and restricted credits. In another embodiment, the invention may be implemented with a machine that accepts and pays only restricted credit according to a single, fixed internal payout schedule ("pay table"). For example, such a machine might be in a "learners" area of a casino that allows for a player to practice on a particular machine at higher odds for restricted credit before playing on machine offering the chance of cashable wins, but at lower odds. Again, for the same reasons noted above, the odds of winning on such a machine could be higher than on other machines in the casino paying only cashable wins without increasing the financial liability of the casino owner.

Methods and systems for enabling gaming machines, cash conversion kiosks, and gaming systems to accept multiple monetary types for game play or tickets enabling game play are described in FIGS. 5 to 17. The figures also describe systems and methods for providing specific credit types, such as restricted credits, upon exchanging currency at a gaming machine or kiosk.

A bill stacker in a gaming machine has firmware that recognizes valid bills. If the item inserted is not recognized by the firmware, the item or bill is ejected or rolled out of the validator. If the item inserted is recognized as a bill of a particular currency or monetary type (described below), the bill validator scans the bill and communicates the value and monetary type of the bill (represented by a code) to the appropriate gaming machine processors.

A gaming machine of the present invention may be configured to accept bills in a native currency and in one or more other currencies, each of which is referred to as a non-native currency. One monetary type is identified as the native type. In one embodiment, the native type is used for all internal calculations, betting, metering, cash out, and so on. Unless otherwise specified, all monetary amounts used by a gaming machine are of native type. In one embodiment, a native type is configurable by the gaming machine manufacturer and is not changeable once the gaming machine is in the field. In another embodiment, the native type is changeable but may require changing all non-volatile meters to the new native type and all hard meters would have to be reset. External hosts that communicate with the gaming machine after the change in native monetary type would have to be informed given that they expect one monetary type and would have to be adjusted (if possible) to discern the new native monetary type (most external host systems are not capable of recognizing multiple monetary types). In another embodiment, if a gaming machine does not have any cash in it and does not have a pre-set native monetary type, the type is defined as the first monetary type put in the machine at the beginning of one player's gaming session. In this embodiment, as long as there is cash in the machine, the native type remains constant, and any cash in not of that type must be converted to that type. When the player plays does the cash in or cashes out, the gaming session is considered over. After that, the next monetary type that is put in the machine determines the native type for the next gaming session.

As noted, the native currency is the monetary type in which the gaming machine performs all its accounting, metering, wins, losses, wagering, etc. For example, gaming machines in all jurisdictions in the United States have a U.S. monetary type as its native currency. When a US $10 bill is entered into a gaming machine in the United States, the meters are credited in that amount and all subsequent accounting and wagering is performed in the U.S. monetary type. Various characteristics and features of a monetary type as may be utilized in a gaming machine of the present invention are described in FIG. 5. A monetary type is a fixed definition of a country's monetary system. It contains a definition of what denominations the monetary system contains, how monetary amounts are to be displayed, and other information as may be required. The monetary system defines a base denomination and a whole denomination. The base denomination is the smallest denomination in the monetary system. All larger denominations must be integer multiples of the base denomination. The whole denomination is the denomination in which amounts are most commonly expressed. All amounts in a monetary type are expressed in base units, the number of base denominations required to represent that value. Thus, as shown in FIG. 5, an amount of 100 US would be 100 cents, or one dollar.

A monetary type table 502 has numerous fields, such as name, country code, base denomination, whole denomination, and data on how to display the monetary type, grouped as fields 504. Other information may also be included in the fields, such as for displaying an amount in base units, "c" represents the base unit (cents) and that a comma is used as the thousands separator and decimal points are not used. In another example, for displaying in whole units, "$" represents the whole unit (dollars) and a comma is used as the thousands separator and a period is used as the decimal separator, and the like. Information on denominations, such as name, value, and physical type are grouped as fields 506. In other embodiments, there may be fewer or more fields in groups 504 and 506 as may be required by specific implementations on the gaming machine. In one embodiment, monetary tables for all monetary types supported by a gaming machine are stored in the machine's non-volatile memory. In another embodiment, some or all of the tables may be stored on a host server in a gaming network or a server having specific functionality for currency conversion in the gaming network.

Figure 6A:
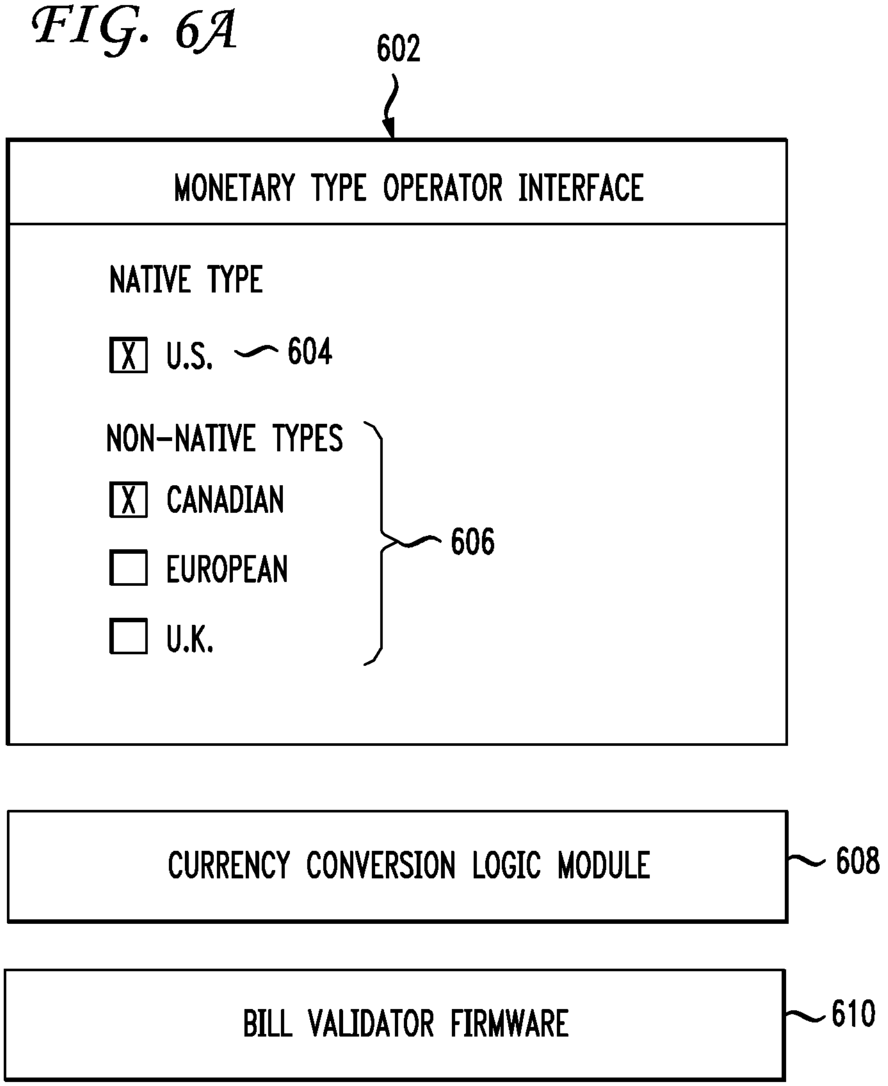
FIG. 6A is a screen shot of an operator menu providing for selection of monetary types on a gaming machine and logic components associated with implementing the interface in accordance with one embodiment of the present invention.

FIG. 6A is a screen shot of an operator menu providing for selection of monetary types on a gaming machine and logic components associated with implementing the interface in accordance with one embodiment of the present invention. An example of a monetary type operator interface 602 has a section for the native monetary type 604. As described above, the native monetary type may be preset by the gaming machine manufacturer, thus the box to the left of United States may be selected before it reaches the gaming operator. In other embodiments, the native monetary type is simply provided and means for selecting or giving the operator the appearance that the native type is selectable is not shown. In non-native types section 606, in one embodiment the gaming operator is shown a list of one or more non-native monetary types from which the operator can select. In one scenario, the gaming operator instructs the gaming machine manufacturer as to which non-native monetary types the operator wants supportable on the gaming machine. For example, from the approximately 185 monetary types, a casino may only want three non-native types supportable on their multiple currency machines, such as Canadian, European, and U.K. monetary types. From those three, the casino selects one non-native type. In other embodiments, more than one non-native type can be selected. In another embodiment, the casino may not be provided with a selection of multiple non-native monetary types and may have only one type which is pre-set or preconfigured for the machine by the machine manufacturer based on prior discussions with the gaming operator, rendering operator or attendant menu 602 unnecessary. In this embodiment and other embodiments, such as those described above, a screen providing basic information on the monetary types (such as in a form similar to table 502) is shown to the operator. Whichever type of information is displayed to the operator, the physical monitor showing the data may be the gaming machine monitor, a monitor on a portable device used by an attendant (for example, for older machines that do not have electronic displays), or may be displayed on a gaming network administration monitor at a network control center.

Also shown in FIG. 6A are a currency conversion logic module 608 and a bill validator firmware module 610. These are intended to represent logical components that contain software implemented in a gaming machine or a gaming network. Currency conversion logic module 608 contains software for providing interface 602 or other information to a gaming operator. It may also include software for performing all the currency conversions, implementing the rules and other calculations described below relating to the machine's ability to accept native and non-native monetary types for wagering. It may also include software for implementing some or all of the safeguards and other rules established by the casino to ensure that the machine's currency conversion functionality is not used for non-gaming purposes. Bill validator firmware 610, as described below, is a firmware component of the machine's bill validator that performs validation and other checks on currencies that are inserted into the machine. For example, upon performing a scan of a bill, firmware 610 may determine the country code of the bill, whether it is valid, the amount of cash in, triggering when a conversion should be performed, and so on. In other embodiments, firmware 610 may be included in conversion logic module 608, where all currency conversion operations (for example, from accepting a non-native bill to performing the final steps in a conversion calculation) are performed by one module. In other embodiments, currency conversion logic module 608 may be stored on a host server in the gaming network rather than on a gaming machine.

Figure 6B:
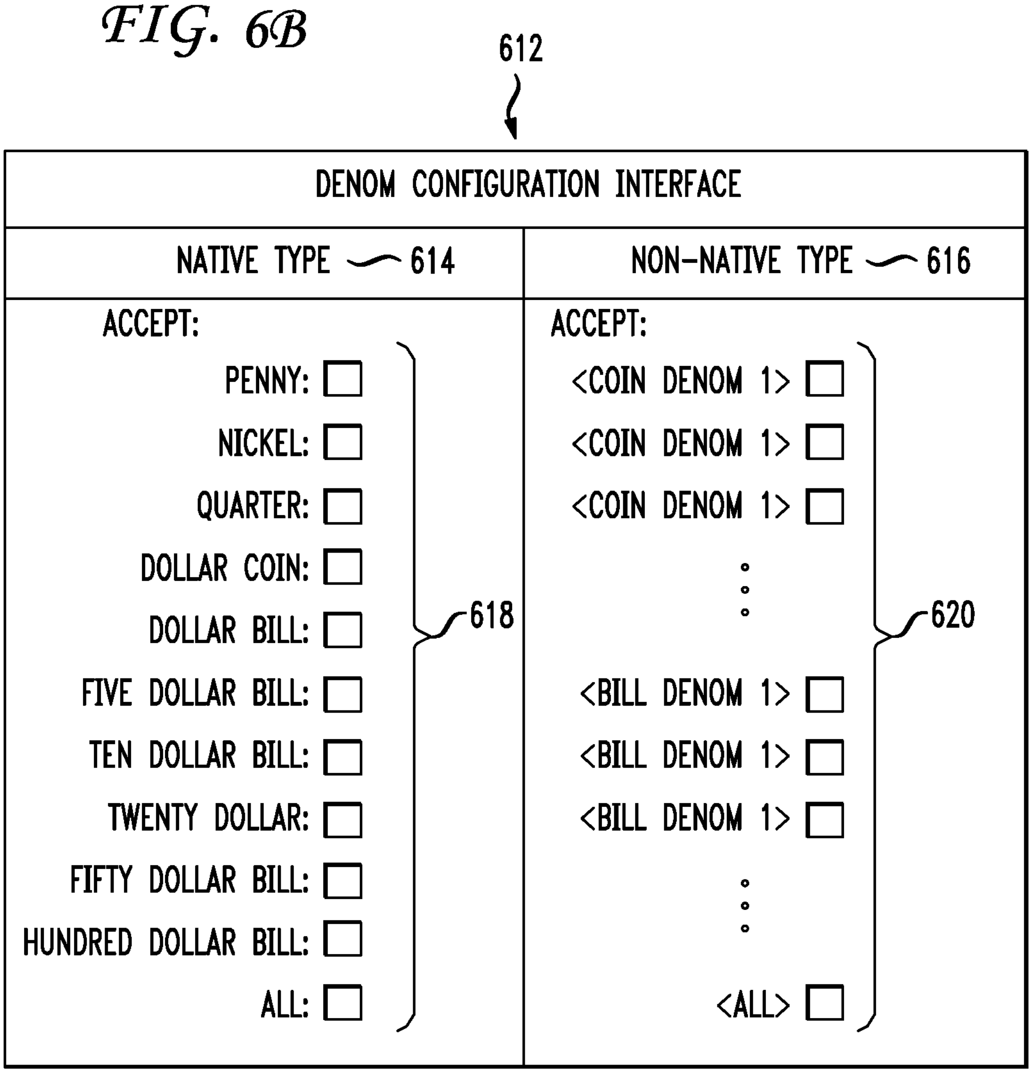
FIG. 6B is a sample screenshot of a denomination configuration operator interface.

FIG. 6B is a sample screenshot of a denomination configuration operator interface 612. This is an example of an interface menu available to an operator for use with a gaming machine of the present invention. Interface 612 allows an operator to select which denominations will be accepted by a cash conversion gaming machine for both native type 614 and non-native type 616. In other embodiments, additional non-native types may also be included in interface 612. The operator may select which denominations will be accepted in the machine by enabling (or checking) one or more boxes 618. These denominations may be taken from section 506 of monetary type table 502 described above. Similarly, the operator may select which denominations will be accepted and converted by the machine by enabling one or more boxes 620. This may be useful for gaming operators who want to limit the amount of conversions performed by a gaming machine. For example, it may not be profitable for the operator to allow conversions of single Canadian dollars to U.S. dollars because of the conversion rate or conversions of one British pound to Euros. The exchange rate may be too low, for example, and the gaming operator may want players to wager larger amounts if they are to be converting from one currency to another. In this case, the operator may select ALL or numerous denominations for the native monetary denomination but may only select <BILL DENOM 3> and higher for the non-native denomination, thereby only allowing conversion and wagering for higher amounts in the non-native currency. In another example, an operator may be experiencing an unusually high number of counterfeit Canadian $100 bills or British £ 50 notes and may temporarily disable acceptance of that particular denomination using interface 612.

Figure 7:
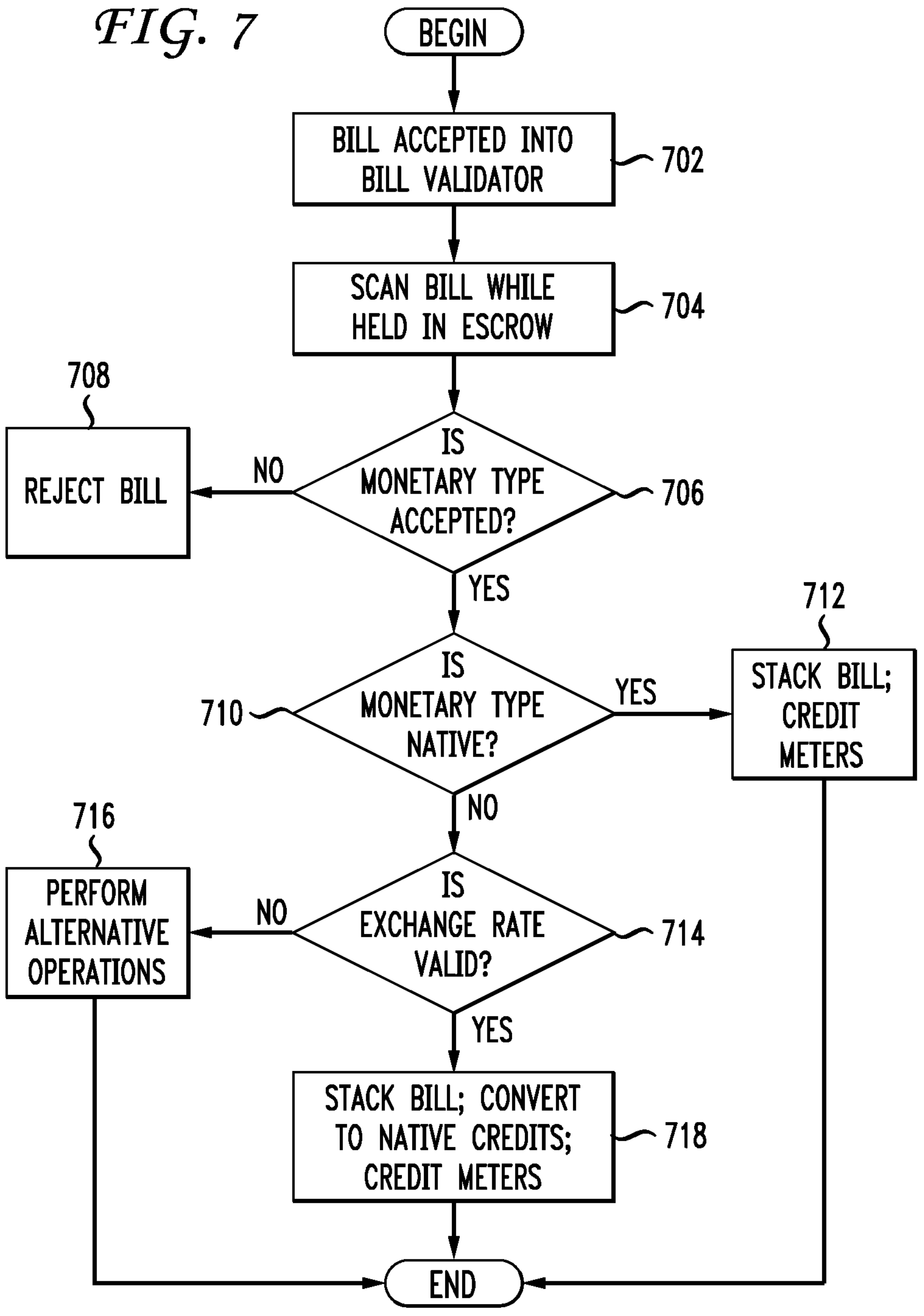
FIG. 7 is a flow diagram of a process for accepting a non-native currency in a gaming machine.

FIG. 7 is a flow diagram of a process for accepting a non-native currency in a gaming machine. At step 702 a bill is accepted into bill validator and held in escrow by the validator. The bill can still be rejected by the validator and rolled out of the machine back to the user. While the bill is in escrow, it is examined or scanned by the validator or other suitable component of the gaming machine at step 704. During the scan, the bill validator determines the monetary type of the inserted bill by examining indicia on the bill that indicates its monetary type. At step 706 the bill validator uses its associated firmware to determine whether the gaming machine has been configured to accept the monetary type, that is, whether the machine is able to accept the perform certain operations, such as conversion to a native type, for that currency. If the machine is not, the bill is rejected and rolled out to the user at step 708. If the machine is equipped with an electronic display, a message may appear informing the player that the currency inserted is not supported by the machine. The functionality for providing this message may be included in conversion logic component 604. A bill may also be rejected (during or before scanning) for being an invalid bill (e.g., unrecognizable dimensions, non-paper material, etc.) or for being a counterfeit note and the like. It should also be noted that the bill validator firmware may recognize a bill but still reject the bill because the gaming machine does not support the monetary type. That is, the firmware in the machine may be configured to recognize a bill of a certain monetary type, but not be configured to perform accounting and game play operations in that currency.

If it is determined at step 706 the monetary type is accepted by the machine, at step 710 the bill validator determines whether the currency is a native monetary type. If it is, control goes to step 712 where the bill is stacked by the machine's bill stacker and the appropriate meters are credited based on the cash-in amount. If the monetary type is not native, at step 614 the bill validator or other component in the gaming machine determines whether the exchange rate stored by the machine for that monetary type to the native type of the gaming machine is valid. As described below, a gaming machine may use one of several exchange rates depending on the circumstances. This may be done by comparing the date and time the bill is inserted into the machine with the exchange rate's expiration date and time or the "valid until" data of the stored exchange rate. If the rate stored by the machine has expired, the machine may take one of multiple actions. In one embodiment, the machine enters a tilt state until a new, current exchange rate is received from a host server, central system, or an external system. Details on remotely configuring a gaming machine are described in U.S. Pat. No. 6,884,174, titled "Communication Protocol for Gaming System Configuration," issued Apr. 26, 2005, which is incorporated herein in its entirety and for all purposes. In another embodiment, a new current exchange rate is entered "manually" by the gaming operator. Exchange rate configuration would normally be a high-security setting which would require a key to open the gaming machine door, then a proprietary electronic key, for example a USB device with security codes to display certain options. An additional privilege key may be requested to see further options in the operations menu, including exchange rates.

Each monetary type has an exchange rate that can be used to convert an amount of that monetary type to an amount in another monetary type, such as a native monetary type of a gaming machine. As described above, in the gaming machine context, an exchange rate is stored as a configuration item and is changeable by an operator or by an external host. In one embodiment, exchange rates are stored as a numerator and a denominator for greatest accuracy. With reference to the monetary table of FIG. 5 above, in one embodiment, both the cash in amount and a native amount are in base units of their respective monetary types. In one embodiment, the native amount is an integer (preferred given that a gaming machine may not be able to process a fraction of a base unit). Further details on the conversion process are provided below.

Figure 8:
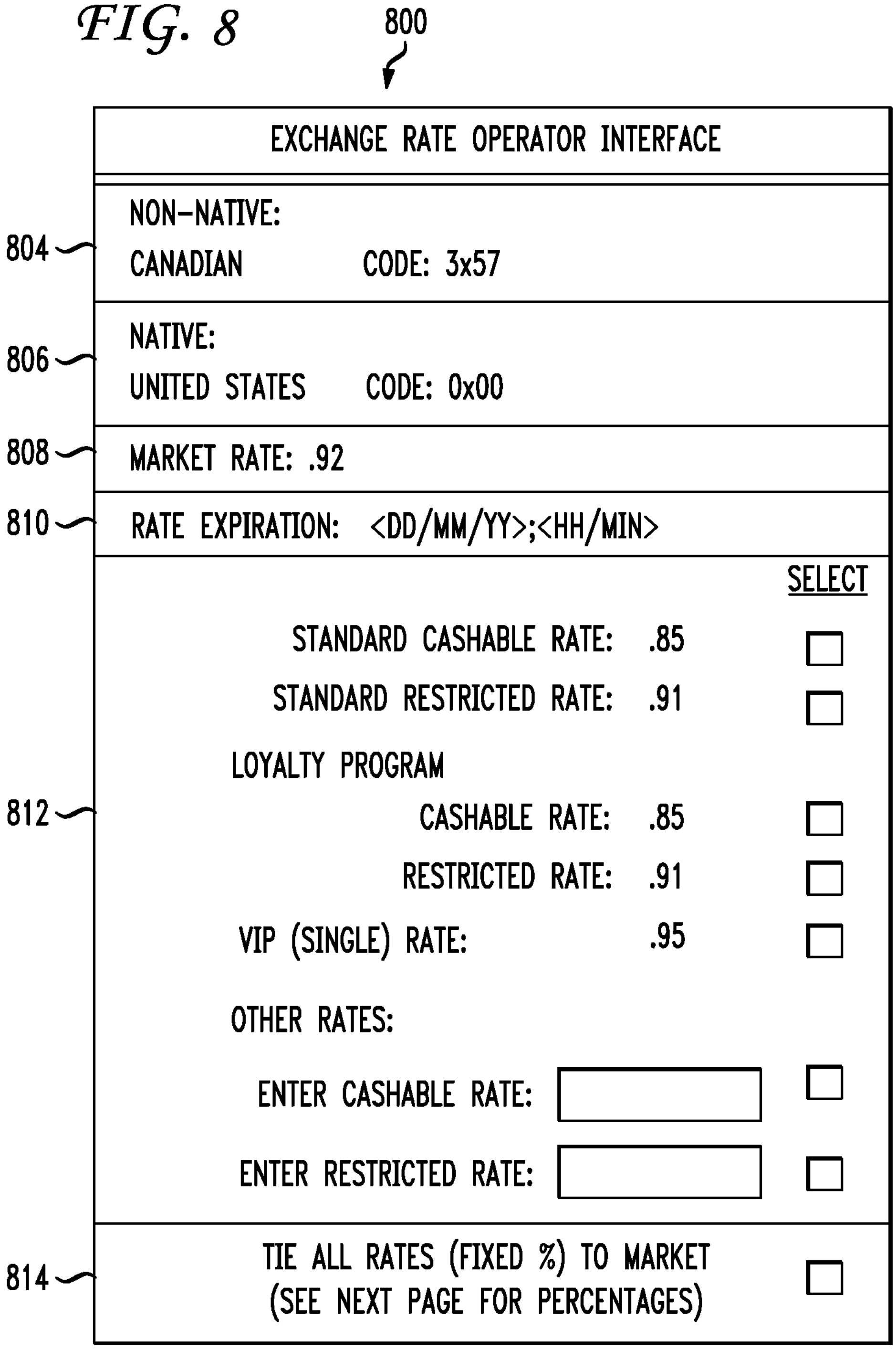
FIG. 8 is an example of an operator interface allowing selection of various exchange rates for converting a non-native amount to a native amount in the machine in accordance with one embodiment of the present invention.

FIG. 8 is an example of an operator menu allowing selection of various exchange rates for converting a non-native amount to a native amount in the machine in accordance with one embodiment of the present invention. An interface 802 conveying data relating to exchange rates for a non-native monetary type may be displayed on a gaming machine, a portable device, such as a laptop computer or hand-held device, at a gaming network administrator workstation, and the like. In one embodiment there is a field 804 for displaying the non-native type and the type code, as initially shown in FIG. 5. Field 806 shows the native monetary type and its code. In other embodiments field 806 may not be necessary or both monetary types (or only their codes) are displayed in a single field. The market or official exchange rate is provided in field 808. We note here that the examples used in table 802 and below are two digit decimal numbers for ease of illustration but that in actual implementation these numbers may extend to five or more decimal places and, as noted earlier, may be represented internally as a fraction. The market exchange rate may be obtained from a third party to the gaming operator, for example, once a day or as deemed necessary by the operator. A rate's expiration date field 810 stores a date and time at which the exchange rates expire. In one embodiment, the expiration date/time may apply only to the casino-set exchange rates, described below in fields 812. In another embodiment, it may apply to the market rate shown in field 808 or to both if the rates established by the casino are tied or linked to a percentage of the market rate.

Section 812 displays examples of exchange rate types and a means for allowing an operator to select a particular rate by checking a box next to each rate or manually entering a rate. These rate types are merely illustrative of the type of rates that can be set by an operator. For example, these include a standard cashable rate (for exchanging to cashable credits) and restricted rate (for exchanging to restricted or promotional credits), one or more loyalty programs (e.g., player tracking participant) cashable rates and restricted rates, and so on. An operator may also have the option of entering a cashable rate and restricted rate in the interface. Another field 814 displays an option for allowing an operator to tie all exchange rates to the market rate by a percentage as described in more detail below. In one embodiment, the interface provides the option of displaying a schedule of the percentages and may allow the operator to change the percentages. As noted, the format and information displayed in screen 802 is one example of many different formats and shows one set of information that can be displayed to an operator. In other embodiments, the screen may be partitioned into two or more screens, each having a different requisite security level for access. For example, the select boxes (or other selection means) may only be displayed to casino employees with the highest security access. Other options not shown in interface 802 may include the ability to manually update the market rate or rate expiration.

In another embodiment, the new exchange rate is stored on a USB device and is uploaded to the machine upon insertion of the device in a privileged or highly secure USB port inside the machine. In another embodiment, which the exchange rate is changed manually, if the delta between the new, current exchange rate and the expired rate is greater than a certain amount or spread, the machine is forced into a hard tilt and further game play is prevented until reset by the gaming operator. In another embodiment, the gaming operator has preset or "hardcoded" limits on the exchange rates that prevent exchange rate updates.

In another embodiment, if the exchange rate has expired and the time since expiration is not greater than a predetermined time, the gaming machine may offer the player an exchange rate that is higher than the expired rate on the condition that the player agrees to receiving only restricted credits for the cash-in amount. In another embodiment, the gaming machine may offer a combination of restricted and cashable credits. The restricted credit exchange rate in this embodiment may be manually entered by the gaming operator and be a special or custom rate. For example, this rate may be a multiple of the expired rate, such as 10% or 15% of the previous rate. In this scenario, only the "mark-up" percentage needs to be maintained on the machine.

If the exchange rate for the monetary type has not expired, at step 718 the bill is stacked and the non-native amount is converted using the exchange rate to the native type. The meters are credited according to the native amount and the process is complete. Details of the conversion process and the different values resulting from the conversion are discussed in greater detail below.

As noted above, when a non-native cash-in amount is converted in the gaming machine to a native amount using an exchange rate, there may be different values or amounts resulting from the conversion according to the gaming context. This may be due to one or more factors. One factor may be the ability or inability to wager fractional credits on a machine. Another may be non-native "left over" amounts resulting from the inability to convert the non-native amount to integer base units of native currency and cannot be returned to the player as integer base units of the non-native currency.

Figure 9:
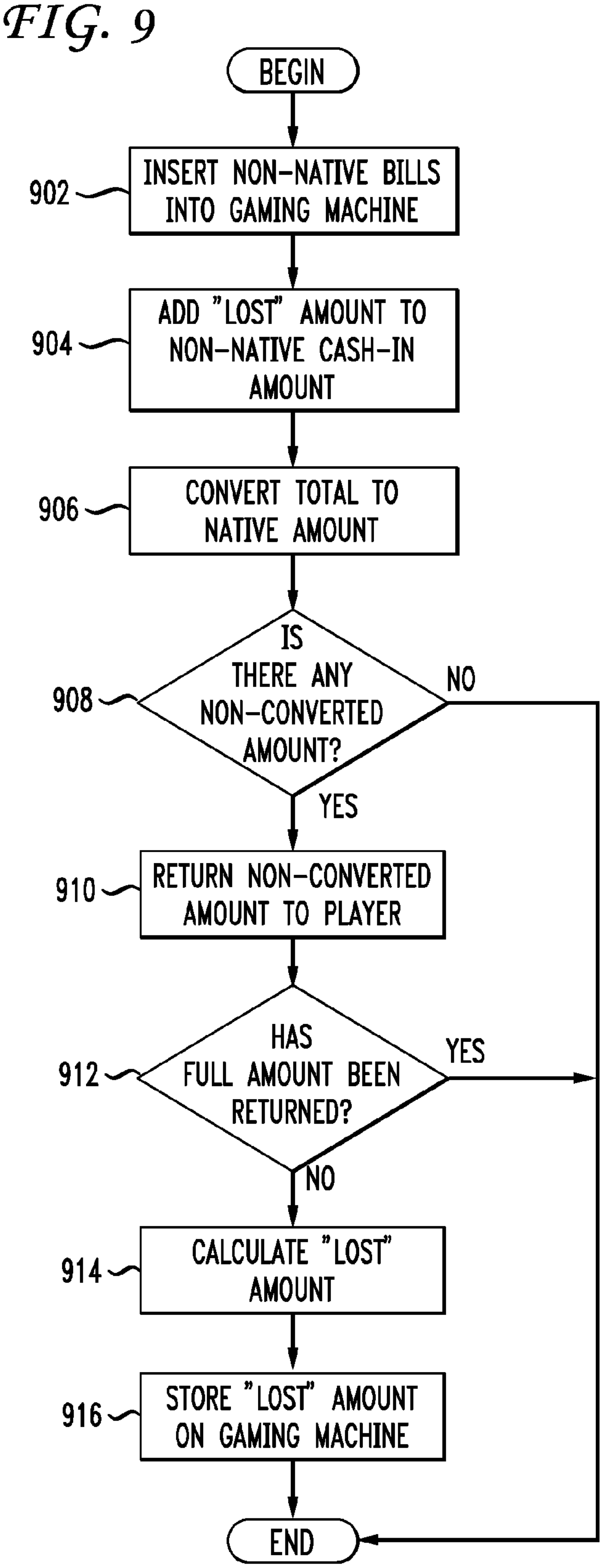
FIG. 9 is a flow diagram of a process of a player using a non-native currency at a gaming machine capable of accepting a native and non-native currency.

Various embodiments are described by way of examples of the different scenarios in which currency conversion and relevant aspects of game play (e.g., restricted and cashable credits, player tracking, cashing out options, and so on) may take place in accordance with the present invention. FIG. 9 is a flow diagram of an example of a player using a non-native currency at a gaming machine capable of accepting its native currency and one non-native currency and where the player is not using player tracking. At step 902 a player inserts a single bill of non-native currency, for example a Canadian $10 bill. In one embodiment, the player has the option of inserting additional Canadian bills which are held in escrow by the bill validator and are not converted immediately. In another embodiment a bill inserted by a player is converted immediately upon insertion (and after the requisite validity and monetary type checks). In this embodiment the $10 Canadian bill is converted to the native type before waiting for additional cash-in. In another embodiment, payments can be made via other means such as EFT, tickets, and coupons.

At step 904 a left-over or "lost" amount may be added to the non-native cash-in amount. This amount, if there is one, is stored in and retrieved from the gaming machine's non-volatile memory. The calculation of this amount is described below. At step 906 the total non-native amount is converted to the machine's native type. In the embodiment where the cash in amount is held in escrow before conversion, when the player is done inserting bills, he or she instructs the machine in some manner to perform the conversion. In one example, this may be done by not inserting another bill for x seconds (e.g., 7 seconds). In another example, if the gaming machine is equipped with an electronic display, the player may press a "CONVERT CURRENCY" or similar icon on the display. The cumulative cash-in amount is converted which may result, depending on the amount, the conversion rate, and the like, in a lower returnable amount to the player and/or a lower lost amount, further described below. In the embodiment where the conversion occurs immediately upon insertion of the bills, any lost amount stored in the machine may be added to the first converted amount. In one embodiment, the converted value (now in native currency type) is rounded down to the nearest base unit of the native currency as provided in the monetary type table shown in FIG. 5. To illustrate, $10 Canadian may have an intermediate exchange value of US $9.477, which is rounded down to a final conversion value of US $9.47 (the nearest base unit being the cent for U.S. monetary type). In another embodiment, the converted amount is rounded up to the nearest base unit, resulting in $9.48.

At step 908 the gaming machine determines whether there is a non-native cash-in amount that could not be converted to an amount in the native currency. For example, this may occur if the non-native amount has a very high exchange rate with respect to the native currency type, such as converting Japanese yen to British pounds or U.S. dollars. In these cases, even after the converted value is rounded down or rounded up to the native base unit, there may be amounts of non-native currency that remain as unconverted. In one embodiment, any amount not converted to the native base unit cannot be accepted and accounted for in the gaming machine and cannot be converted to credits for wagering in the machine. In another embodiment, the non-native amount that cannot be converted to a base unit in the native currency is converted to a fraction of the base unit which may be represented as fractional credits playable on the gaming machine. This technique may also be applied to native amounts that are rounded to the nearest base unit, such as US $9.47 example above, on a gaming machine that has a higher minimum wager amount, such as 5 cents or 25 cents. For example on a quarter minimum bet gaming machine, $9.47 would result in 37 and 22/25 credits, where the fractional credit can be played on the machine. Details of implementing fractional credits for wagering in a gaming machine are described in co-pending U.S. patent application Ser. No. 11/035,270, filed on Jan. 12, 2005, by Saffari et al., titled "Payline and Wagering Options for Low Denomination Games," which is incorporated herein in its entirety and for all purposes. If there is no unconverted value, the conversion process is complete.

If there is a non-converted amount, the gaming machine attempts to return the amount to the player at step 910. In one embodiment, the returnable amount is rounded down to the nearest base unit of the non-native currency. In another embodiment the returnable amount is rounded up to the nearest base unit. In one embodiment, the returnable amount is provided to the player in the form of a ticket for the returnable amount. In another embodiment the machine returns non-native coins to the player via the hopper. As noted, the machine attempts to return the full returnable amount to the player. At step 912 the gaming machine checks whether it was successful in doing so. If it was, the conversion process is complete. If it was not, in the embodiment described in this example, a lost or left-over amount is calculated at step 914. This amount may be calculated by subtracting two specific values from the initial non-native cash-in amount (the amount calculated at step 904, which includes a lost value, if any, stored on the machine). One of the values is the amount returned to the player at step 910, that is, the actual returned amount. The other value is derived from dividing the converted native amount as calculated at step 906 (the dividend in native currency) by the exchange rate for the non-native currency (native currency/non-native currency) stored in the gaming machine at the time of calculation. This division results in a value that is in non-native currency, thus making it subtractable from the non-native cash in amount. At step 916 the lost amount calculated at step 914 is stored on the gaming machine for use in the next round of play (regardless of whether it is by the same player or different player) as described at step 904. In one embodiment, the lost amount is stored in a meter, for example, a lost amount meter and may be stored in non-volatile memory on the gaming machine. There may be a separate lost amount meter for each monetary type handled by the gaming machine. In another embodiment, the lost amount is not stored on the machine for subsequent game play but is transferred to a host server on the gaming operator's central system where it is added to previous lost amounts, which can be paid out in the form of a bonus or other manifestation of a win to casino patrons.

In another scenario, a player may have a player tracking account with the casino which he or she uses when playing on a gaming machine capable of currency conversion. The operations that take place on the machine in this scenario are similar to the ones above except that lost amounts can be credited to the player's account rather than being stored on the gaming machine and left for the benefit of the next player. For example, if a player utilizes player tracking any lost amount or unconverted amount of the non-native currency can be added to the player tracking account maintained by the gaming operator. A player tracking database may be modified to store monetary amounts of two or more different monetary types. Thus, a player using a gaming machine in the U.S. may have data on the value of U.S. dollars in the account as well as data showing the amount of Canadian dollars the player has accumulated. In any case, by using player tracking a single player can move from one gaming machine to another and reap the benefit of unconverted amounts and lost amounts collecting in the player's account and may potentially amass to a significant sum over time. Using player tracking in this scenario also prevents the player having the perception that he or she is losing money over time due to conversion. It also prevents other players from benefiting from the rounding operations and lost amount calculations that took place during the player's session.

In another embodiment, player tracking can be used to track the non-native amount a player has entered into machines that perform conversion. For example, over time a player may enter Canadian $1,430 and has not been returned any amount described in step 910 above and has not had any left-over amounts credited to his account. The player tracking system may also keep track of the value the player has been credited or paid for that Canadian dollar amount, for example, US $1,300. In another embodiment the casino may use a constant, casino-wide exchange rate (adjusting it only when there is a significant fluctuation in the market conversion rate), and the player could be credited with any balance in his or her favor. The credit may be performed when a threshold marker is passed (e.g., after one year or after the entered value exceeds $1,500 Canadian) or when the player requests it. In one embodiment, the casino uses the constant exchange rate to calculate a conversion amount by multiplying the amount entered (Canadian $1,430) with the constant exchange rate. The player's account is credited with the difference between the conversion amount and the amount that has been credited to the player over time (US $1,300). Conversion amount may normally be higher than the actual credited amount due to rounding up operations and the left-over amount calculations. The amount credited to the player's account may be in the native monetary type (no conversion needed) or in the non-native monetary type where the constant, casino-wide exchange rate is used for conversion.

Figure 10:
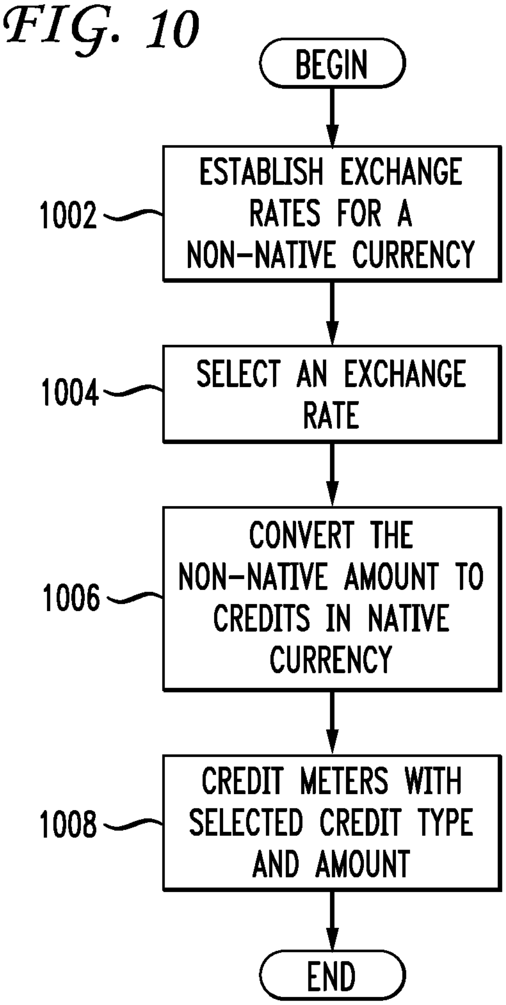
FIG. 10 is a flow diagram of a process of selecting and applying one or more exchange rates in accordance with one embodiment of the present invention.

As described above, exchange rates used in a gaming network may be changed "manually" by the operator (via an attendant using highly secure keys and passwords, for example), disseminated from a host server to all or selected multiple currency-enabled gaming machines and in other methods such as those used in a server-based gaming network. A gaming operator may store different exchange rates for native/non-native monetary types and utilize them in different situations as shown in FIG. 10 below. The exchange rates have a direct effect on the value of a player's wins and losses on a gaming machine. As discussed above, another factor that affects the value of a player's wins and losses is whether the player is using restricted credits cashable credits, or a combination of both for wager game play. At step 906 above, the total non-native cash-in amount is converted to a native amount. This native amount is stored in a meter in the form of a restricted or cashable credit. As described below, the exchange rate used to convert the non-native cash-in amount may depend on whether the player is converting to native cashable credits or restricted credits.

FIG. 10 is a flow diagram of a process of selecting and applying one or more exchange rates in accordance with one embodiment of the present invention. At step 1002 a gaming operator establishes various exchange rates for a non-native monetary type to the native type. Each rate may have its own expiration date/time although some rates may share the same expiration parameters. In one embodiment, a gaming operator may have a standard rate, a promotional rate, a preferred rate, a casino-wide rate, and a market rate. The names for these rates are merely illustrative and are used to describe various embodiments of the invention. Further, in other embodiments there may be more or fewer rates as described herein. The number of rates established by the operator will depend, among other factors, on the granularity or level of service and customization the operator wants to provide to its players. In some cases a casino may apply a favorable rate to players who are of high value to the casino.

Once exchange rates have been established, one or more specific rates are selected by the gaming operator to be used for conversion of non-native currency to native credits. For example, a casino may offer players a better conversion rate if a player converts non-native currency to (native) restricted credits rather than to (native) cashable credits. In a simple illustration, a player inserts $20 Canadian which is converted to US $17.50 worth of cashable credits or to US $18.50 worth of restricted credits. In this scenario the casino may use a "standard" rate of 0.875 for conversion to cashable credits and a "promotional" rate of 0.925 for conversion to restricted credits (as noted, other more descriptive names may be used to describe the rates, such as "cashable" rate, "restricted" rate, etc.).

If the player participates in a player tracking system implemented by the operator, a different set of standard and promotional rates may apply, where the rates are slightly more favorable to the player. Thus, there can be a standard rate A, standard rate B, promotional rate A, promotional rate C, and so on. To further illustrate, a VIP player or a player of high value to the casino may be given highly preferred exchange rates that are equivalent to or better than the market exchange rate. The gaming operator may adjust all these rates based on the market exchange rate. As noted above, all these rates, including the "constant" casino-wide exchange rate, may have expiration dates and are automatically updated to reflect fluctuations in the actual market rate. In another embodiment, the rates offered by the casino may be tied to the market exchange rate by percentage. For example, the standard rate may be set to be 18% less than the market rate, the promotional rate set to 13% less, the preferred rate set to 5%, and so on. In another embodiment, some or all of the rates may be adjusted manually or in an ad hoc manner, and may correlate to changes in the market rate, but is ultimately left to the discretion of the gaming operator. In another embodiment, some of the rates may be tied to the market rate while others are adjusted manually or, for a specific machine, adjusted to meet the desired service level of a particular player. For example, the casino may recognize a particular VIP about to use a machine where the player will be converting non-native currency to native credits and will adjust the exchange rate to a desired level (e.g., 105% of the market rate) in real time to meet the casino's desired service level for that player.

At step 1004 an exchange rate is selected for the session about to begin on a gaming machine. In one embodiment, this is done after the machine has determined the status of the player (for example, non-player tracking participant, player tracking participant, VIP, etc.) and the type of credits being requested. In other embodiments, other factors may be used to select an exchange rate that do not include player status or credit type, such as casino location, time of day, marketing considerations (e.g., introducing a new game), and so on. In another embodiment, only one exchange rate is used for all types of conversions regardless of the specific characteristics mentioned above. At step 906 the gaming machine performs the conversion of the non-native amount to credits in the native monetary type.

At step 1008 the player is credited with either restricted credits, cashable credits, or a combination thereof, all valued in the native monetary type, and game play may begin on the gaming machine. A Cash In thread is described above with respect to FIG. 4. A credit type is determined at step 412 and credits are added to the player's credit amount accordingly at steps 414, 416, and 418. As described above, Play thread 404 shows a process of deducting credits based on their type as wagers are made where restricted credits are deducted before cashable credits, as shown in steps 424 and 426. In one embodiment, this allows a player to play down restricted credits, giving him the opportunity to use the restricted credits to win cashable credits. If and when the restricted credits are depleted, the cashable credits are used for wagering. In other embodiments, the player can select whether to wager restricted or cashable credits.

As described above, which paytable is used for a game may depend on whether restricted or cashable credits are being wagered. This variable paytable feature is further described below in the context of exchange rates and currency conversion on gaming machines. Depending on the paytable used and/or other factors, a win may result in adding cashable credits, restricted credits, or a combination to the credit meter. During Cash Out thread 406, the player may, for restricted credits, print a ticket or cash out as described at step 442 or, for cashable credits, cash-out to ticket, EFT or from the hopper. Details on methods and systems of issuing tickets containing restricted credits are described in U.S. Pat. No. 7,128,650, titled "Gaming Machine with Promotional Item Dispenser," issued Oct. 31, 2006, incorporated herein in its entirety and for all purposes.

In one embodiment, in addition to verification number, number of credits, and other data, a ticket for restricted credits may contain or reference data on the specific wager game from which the credits were won and for which the credits are valid. This may be necessary to prevent players from taking advantage of differing paytables or payback percentages used for multiple games and for different credit types being wagered, as is often practiced by gaming operators. For example, game A may have two different payback percentages: 85% for wagers made with restricted credits and 80% for wagers made with cashable credits. Game B also has two different payback percentages: 90% for restricted credits and 95% for cashable credits. In this embodiment, it is preferable that the player be notified in a clear and explicit manner of the limitations placed on where the restricted credit ticket may be used, e.g., that it can only be used for wagering in the game in which the restricted credits were initially won. In another embodiment, the restricted credit ticket may also reference data on where and how the restricted credits were won, such as indicia of game, location, payback percentage (or an indicia of which paytable was used), and so on. An example of such a ticket and a ticket database is described in FIG. 11 below. If the restricted credits were obtained via currency conversion, data on the exchange rate may be stored on the ticket as well. When the ticket is inserted into a gaming machine as cash-in, the gaming machine can examine how the restricted credits were obtained, such as the payback percentage, exchange rate, etc. Using this data the gaming machine may obtain and utilize a similar or compatible paytable for wagering done with restricted credits on the ticket. In these embodiments, the payback percentage and/or exchange rate data associated with obtaining the restricted credits on the ticket, as well as other data noted above, "travel" with the ticket and can be examined by other gaming machines for the life of those credits. In one embodiment, all of the information may not be present on the ticket but may be referenced by the ticket. The ticket may contain a single reference number to an entry in a back-end database or other appropriate gaming network component that contains data on some or all pending tickets. Such a database may contain all of the required information needed to validate use of the ticket. This embodiment facilitates adding more information to a ticket by adding fields to the database rather than alter each ticket. The back-end database may deny use of the ticket if a player attempts to use it outside of the defined requirements or limitations.

Figure 11:
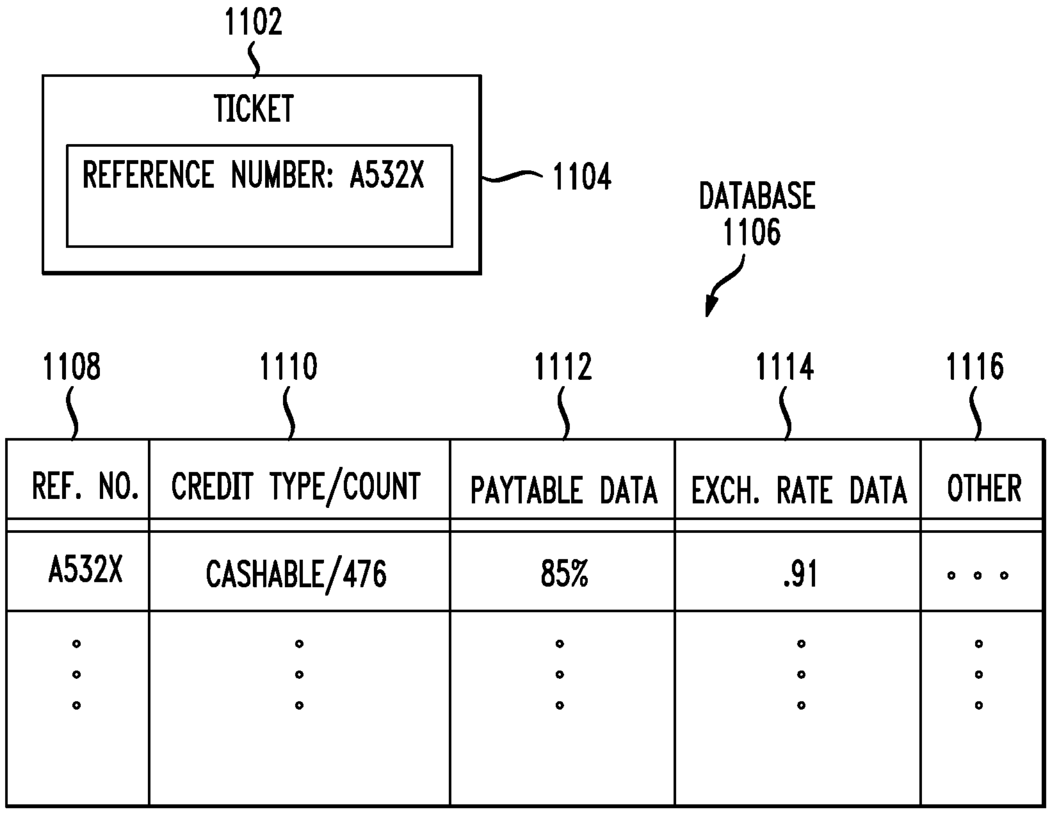
FIG. 11 is a logical block diagram showing a ticket and a ticket database in a gaming network storing information related to a ticket in accordance with one embodiment of the present invention.

FIG. 11 is a logical block diagram showing a ticket and a ticket (or cashless instrument) database in a gaming network storing information related to a ticket in accordance with one embodiment of the present invention. As noted above, a ticket 1102, similar to ticket 220 and other cashless instruments described above in FIG. 1, may only contain a reference number 1104 to a database 1106 in the gaming network that stores data related to the ticket. In other embodiments, data in addition to reference or validation number 1104 may be stored on ticket 1102, or may be stored on both the ticket and in database 1106. Database 1106 may be stored on a suitable back-end server in the gaming network. A reference number field 1108 stores the key that ties a particular ticket with a record in the database, as in the example shown in FIG. 11 with reference number A532X. In other embodiments, other type so database structures may be used to store ticket data. A credit type and number or count field 1110 stores information on the type of credits on the ticket, such as restricted credits in the described embodiment with regard to currency conversion. In other embodiments, the credit type may be cashable or other credit types. A paytable data field 1112 contains data on paytable schedules and pay back percentage that was used in winning the credits on the ticket. There may have been more than one percentage or paytable used, in which case data 1112 may include more specific information, such as how many of the credits on the ticket are associated with each percentage. If there was currency conversion involved in obtaining the credits, an exchange rate data field 1114 containing data on the exchange rate used to obtain the credits. As with payback percentages, if more than one exchange rate was involved, field 1114 may include all or some of those rates. Fields 1112 and 1114 may also contain pointers or keys to other database tables (not shown) that store more detailed information on paytables and exchanges, respectively. A field 1116 includes other types of data such as date and time the ticket was issued, from which gaming machine and game, and so on. Other types of data may also be included in database 1106 and those described here may not be necessary for all tickets.

As described above, in one embodiment a player is able to convert a non-native amount to native restricted credits on a gaming machine. In this embodiment, the player may have the benefit of a more favorable exchange rate because the casino generally encourages players to use restricted (i.e., promotional) credits, which cannot be cashed out but rather must be "played down" or redeemed in another manner. This difference in exchange rates for restricted and cashable credits (for which the exchange rate may not be as favorable to the player), combined with the fact that different gaming machines (and different games) have varying payback percentages and the ability of a player to get a ticket with restricted or cashable credits, make implementing certain rules beneficial to the gaming operator. A situation may arise, for example, where a player begins with a certain number of restricted credits from a cash-in amount on one machine with a certain payback percentage and concludes play on another machine with a different payback percentage with cashable credits that exceed the initial cash-in amount.

In one example, a cash-in amount in a non-native currency at a gaming machine is converted using a specific exchange rate to cashable native credits. The gaming operator may want to encourage players to convert to restricted credits by offering a better exchange rate. One implementation of this is to use the same rate used for cashable credits while factoring in a restricted credit rate, effectively increasing the exchange rate providing the player with a higher number of native restricted credits. In another implementation, there are two different exchange rates, the higher one used for converting to restricted credits, thereby eliminating the need for factoring in a restricted credit rate. In either case, the same non-native currency cash-in amount may result in x cashable credits or x+y restricted credits. The following formulas help illustrate the example:

Foreign Amount*Exchange Rate=Cashable Native Credits; and

Foreign Amount*Exchange Rate*Restricted Credit Rate=Restricted Credits (or Foreign Amount*Higher Exchange Rate=Restricted Credits)

Thus, if

Foreign Amount=$100 Canadian, and

Exchange Rate=0.9, the player receives 90 cashable native credits, which the player can cash out at the machine (for example, in the form of a ticket or coupon) for US $90 (where 1 credit=US $1).

For the same Foreign Amount and Exchange Rate, while factoring

Restricted Credit Rate=1.1 (intended to improve the conversion rate), the player receives 99 restricted native credits (100*0.9*1.1), which are not cashable but may be played down on the same gaming machine or may be placed on a ticket to be played at another machine.

To follow the same example, suppose the player now begins game play on the same machine with the 99 restricted credits. The payback percentage for the machine is 85%. Thus, if all 99 restricted credits are played at the machine, the player may have a maximum win of 84 cashable credits (99*0.85, not taking fractional credits into account). This win amount is less than the initial number of cashable credits that could have been obtained via currency conversion, i.e., 90 cashable credits. In one embodiment, the gaming operator implements rules to ensure that the win amount in the form of cashable credits is always less than or equal to the initial number of obtainable cashable credits. Such rules may involve adjusting exchange rates, payback percentages and game limitations. Other implementations may involve using restricted credit tickets providing the data described above in FIG. 11.

To follow through the same example, the player may place all the initial 99 restricted credits onto a printed ticket and use the ticket as cash-in at another gaming machine with the intention of playing them down at the second machine. Suppose payback percentage of the second machine is 95%. The paytable percentages of either or both machines may or may not be known to the player. If the 99 restricted credits are played down on the second machine, the player may have a maximum win amount of 94 native cashable credits (99*0.95). This win amount is greater than the initial number of cashable credits that could have been obtained via currency conversion from the $100 Canadian. The 94 cashable credits can be cashed for US $94, thus, converting $100 Canadian to US $94 (i.e., getting a 0.94 exchange rate). In this manner, the player bypassed whether intentionally or unintentionally the gaming operator's exchange rate of 0.9. It is also possible that the player obtained a better rate than the official foreign exchange rate, which may be 0.91 or 0.92.

The combination of currency conversion, the ability to cash out, and the lack of mandated record keeping by players, as well as other factors, all centered around a gaming machine, may necessitate certain rules and safeguards be in place. These may be for the protection of the gaming operator from illegal or undesirable currency conversions, such those done for money laundering or for using gaming machines as currency exchange kiosks without any game play. In one embodiment, the central system in the gaming network, via a "currency conversion oversight" server or module for example, may prevent, at the system's discretion, any attempt to convert currency on a machine if deemed necessary by the gaming operator. This may be done, for example, to abide by state and federal laws (e.g., banking laws), regulatory body regulations and jurisdictional requirements, and rules established by the gaming operator itself. Some of these self-imposed rules may be permanent (or persistent) rules followed by the operator's gaming network and others may be created in an ad hoc manner in specific situations. The software embodying these rules may be included in currency conversion logic module 604 on the gaming machine or in a gaming network server, such as a dedicated server responsible for currency conversion oversight. This may be a requirement by the appropriate gaming regulatory body and other authorities, such as banking regulators.

In one embodiment the gaming operator may at its own discretion disable any currency conversion and, thus, game play in a non-native currency, at a specific machine. A gaming operator may want to or be required to prevent players or users from using a gaming machine to convert large amounts of non-native cash to native cash without any game play. For example, a user, not using player tracking, may want to exchange Canadian $10,000 to cashable credits in U.S. dollars for nefarious reasons even if at the lowest exchange rate offered by the casino. Exchanging this amount of cash at a bank or currency exchange service would normally leave a "paper trail" containing information about the party requesting the conversion. No such documentation would be left behind if the exchange were performed by a user not having player tracking at a gaming machine. Such exchanges may often involve criminal activity or may be, by statute, illegal.

In one embodiment, a casino may track the volume of conversions being performed at each gaming machine. This tracking may be implemented in several ways. In one example, a casino keeps track of the number of high denomination bills being entered into a machine. For example, a casino operator is alerted if there is a high volume of Canadian $100 bills being inserted into a machine having a U.S. native type. The geographic location and prevalence of suspicious currency exchange activity, among other factors, may all play a role in shaping a casino's policy and rules with respect to currency conversion at its gaming machines. As may be known to law enforcement officials, there are certain countries or jurisdictions where money laundering is a persistent issue, especially exchanging illegally obtained funds in one currency to another currency to evade detection or suspicion. Casinos in these areas may have more oversight and stricter policies regarding currency conversion at its gaming machines.

In another embodiment, the casino's use of cashable and restricted credits may be leveraged to discourage using gaming machines as non-trackable, currency exchange kiosks. For example, if a conversion from a certain high denomination non-native bill takes place, the gaming machine will return only restricted credits, either on to play down on the machine or take away on a ticket. This forces the player to play down the restricted credits and only walk away with his winnings from those credits in cash. In another embodiment, the returned amount from a conversion, as described above, is provided as restricted credits only. A casino can implement different ways and set various thresholds as to when a cash-in amount and the denominations used limit the currency conversion feature of a gaming machine. At the least, using these rules, combined with temporal restrictions (e.g., only x number of conversions in a 12-hour period are allowed on a machine), a casino may make it very time consuming and burdensome for undesirable users from using a gaming machine for illicit purposes, such as money laundering.

Figure 12A:
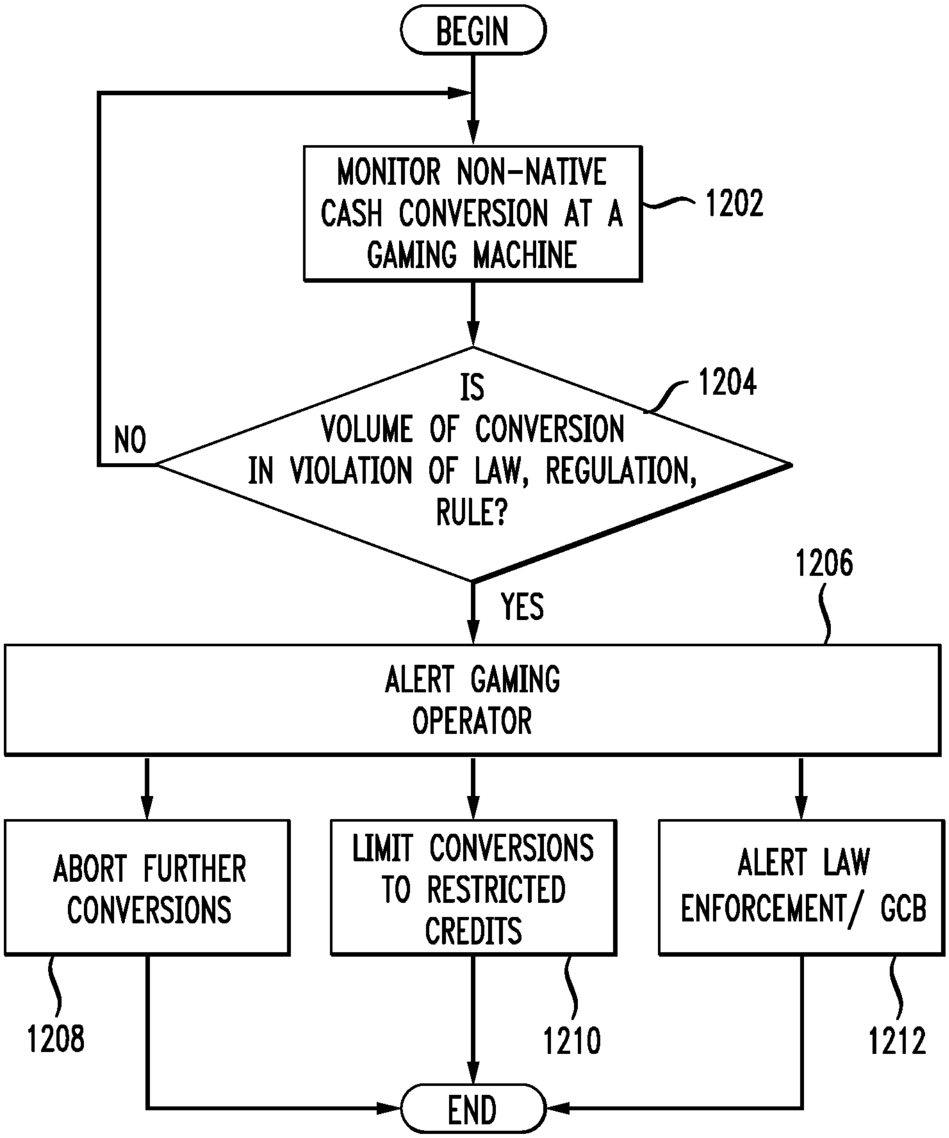
FIG. 12A is a flow diagram of processes for monitoring conversion activity and performing appropriate actions in accordance with one embodiment of the present invention.

FIG. 12A is a flow diagram of processes for monitoring conversion activity and performing appropriate actions in accordance with one embodiment of the present invention. The steps described in FIG. 12A may be performed on a gaming machine, on a host server in the gaming network, or on both. In one embodiment, the modules and logic needed for performing the oversight functions described in FIG. 12A are performed on a host server 1214 shown in FIG. 12B that may be described as a currency conversion oversight server or a server process executing on a host server also having other functions.

Figure 12B:
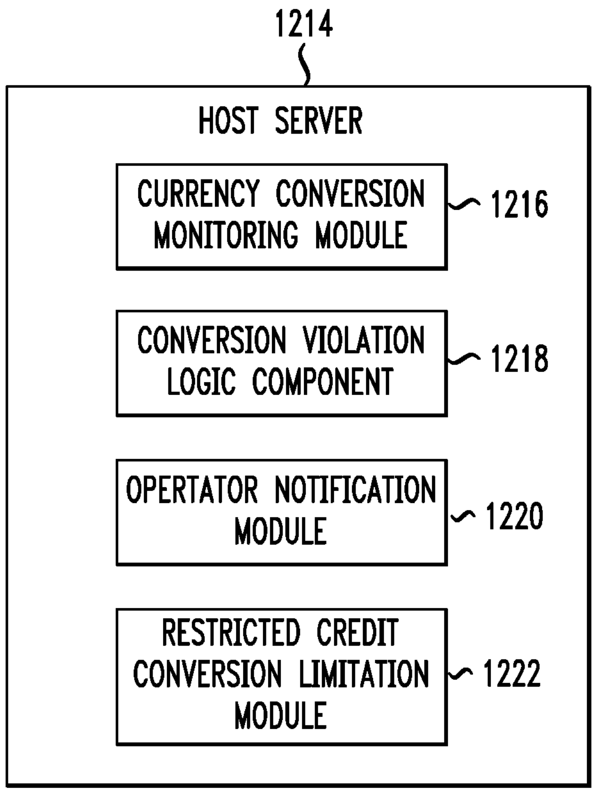
FIG. 12B is a block diagram showing components and modules for monitoring currency conversion activity and performing appropriate actions if violations are detected.

At step 1202 a gaming operator monitors currency conversions at its gaming machines. This may be done in numerous ways, but in one embodiment is performed at the gaming machine level. The monitoring may be done by a currency conversion monitory module 1216 on host server 1214 as shown in FIG. 12B or similar component on the gaming network. Such a component may also reside at the gaming machine where a gaming machine keeps track of the volume of conversions occurring at that machine. In another embodiment, one gaming machine may perform such monitoring for other gaming machines using module 1216. At step 1204 it is determined whether the volume of currency conversion is in violation of any laws, regulations, rules, policies, guidelines, and the like. In one embodiment, these are embodied as a currency conversion rules logic component 1218 as shown in FIG. 12B and may be modified time to time by the gaming operator. As described above, they may include a wide variety of rules ranging from federal banking statutes to casino-derived, self-imposed guidelines.

If the volume of conversion is in violation of a rule or guideline, at step 1206 the gaming operator is alerted. This may be done by an operator notification module 1220 as shown in FIG. 12B. In one embodiment, a communication is transmitted to a component in the gaming network which takes appropriate action. In another embodiment, a visual, audio, or other type of alert intended to draw attention of a gaming network administrator is sent to a workstation or portable device (e.g., pager, laptop, etc.). Once notified either via the system or manually to an administrator, one of several steps may be taken. These may include step 1208 in which the gaming operator ceases all conversions at the gaming machine, step 1210 in which all or certain types of conversions are limited to obtaining restricted credits only, and step 1212 in which the gaming operator alerts the appropriate law enforcement or regulatory bodies, such as the GCB for that jurisdiction. Various modules and logic components on host server 1214 or on the gaming machine may be utilized to implement these actions. For example, a conversion limitation module 1222 may be used to limit all subsequent currency conversions to restricted credits. Other actions may be taken by the gaming operator to detect and monitor unusual or illegal currency conversions and may be taken to prevent or act on such activity that are not described in FIG. 12A.

Gaming machines capable of game play in the machine's native currency and in a non-native currency may also be used for harm minimization and, more generally, limiting financial losses incurred by a particular player. For example, as has been practiced in the gaming industry for years, it is desirable for a casino to take certain measures and safeguards to prevent players, such as addictive gamers, from inflicting severe financial harm to themselves from gaming. If a player has player tracking the casino can follow game play by that player and trigger an alert if the player's losses exceed a certain amount in a 24-hour period. Additional controls or metrics used to gauge losses and track a player's activity may be available from examining currency conversions. Such conversions, coupled with flexibility of the gaming machine to issue only restricted credits at varying rates, may be used to discourage a player from continuing further game play, for example.

A central system may impose restrictions based on the amount that has been converted, actually played (to distinguish it from money laundering issues), and lost. A casino may attempt to discourage a player from continuing game play by only allowing conversion, for example, to native restricted credits at a sub-standard and unattractive rate. Such a combination of credit type and conversion rate may be used to make a player averse to continuing game play (one of the primary goals of harm minimization). In such scenarios, it would be desirable to make it explicitly known to the player that he will only obtain restricted credits from any further conversions and that the conversion rate is x amount, perhaps making it clear that this the rate is y % less than the standard casino rate. There are other tactics a casino may use involving exchange rates coupled with credit type, payback percentages, and so on, that can be used for limiting losses experienced by particular players.

Figure 13:
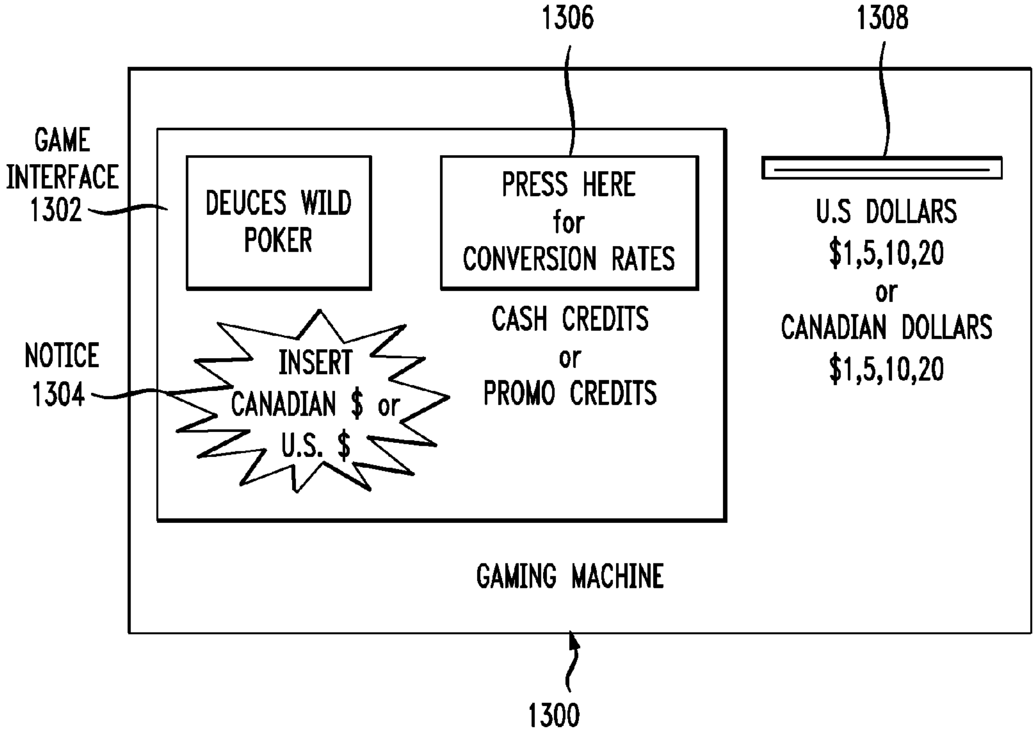
FIG. 13 is a block diagram of a gaming machine from the vantage of a player in accordance with one embodiment of the present invention.

As described in FIGS. 5 to 12, a gaming machine of the present invention is capable of accepting cash in a non-native or foreign currency for wager game play on the machine. FIG. 13 is a block diagram of a gaming machine from the vantage of a player in accordance with one embodiment of the present invention. A gaming machine 1300 (or other gaming device) has a game interface 1302 for displaying information to a player, such as the name of the game (in this example, Deuces Wild Poker). Also included is a notice 1304 conveying to players that they can insert two different types of currencies. In other embodiments there may be more than two choices. In yet other embodiment, a player may insert bills (or a cashless instrument, such as a ticket) in both currencies. The notice may also convey to the player that conversions may be made to either cash or promotional (restricted) credits, or a combination of both. An area 1306 of game interface 1302 may allow the player to view conversion rates (i.e., exchange rates) for obtaining credits and the like. A bill validator 1308, such as the one shown in FIG. 1, is capable of accepting and validating bills in the native and in one non-native monetary type. In other embodiments, validator 1308 may be able to accept bills in two or more non-native monetary types. A notice on game interface 1302 or on machine 1300 may state the types of currencies accepted and the various denominations. FIG. 13 is one embodiment of a gaming machine and shows some of the features relevant to the present invention. There may be numerous other features, as described above with respect to FIG. 1, or fewer features than those shown in FIG. 13 for implementing the present invention.

Figure 14:
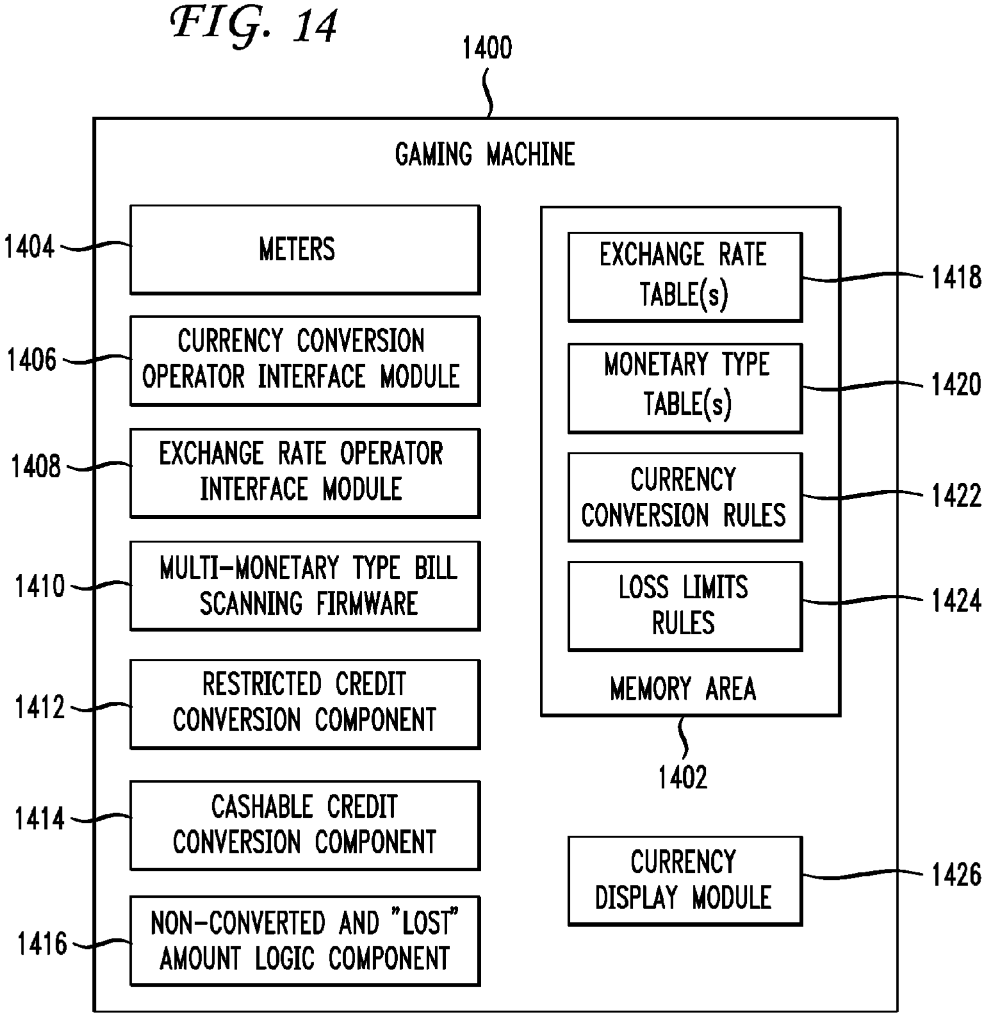
FIG. 14 is a block diagram showing various components that may be used to implement the present invention on a gaming machine in accordance with one embodiment.

Various logic components, interface modules, and types of data and their implementations and embodiments have been described above. For some of these items there are numerous means by which they may be implemented or embodied in a gaming network, such as on a gaming machine or other component, such as a host server. FIG. 14 is a block diagram showing various components that may be used to implement the present invention on a gaming machine in accordance with one embodiment. As mentioned above, all internal accounting, wagering, cash outs, and the like are done in a native monetary type in a gaming machine and, more generally, in the gaming network. The various hard and software meters in a gaming machine of the present invention are described in FIG. 15. They are represented in FIG. 14 generally as meters 1404.

Also shown in gaming machine 1400 are currency conversion interface module 1406 and exchange rate interface module 1408 that contain logic and code that may be needed to display operator interfaces or menus and accept input from the interfaces. As described above, a gaming operator may view and enter currency conversion data on a gaming machine through an interface as first shown in FIG. 6. Similarly, an operator may view and enter data relating to exchange rates using an interface as shown in FIG. 8. These interfaces may be generated and maintained using modules 1406 and 1408, respectively. In one embodiment, these modules may be implemented in a single interface module that handles all operator and user interfaces relating to currency conversion on a gaming machine. This single module may have two subdivisions or sub-modules, one for selecting currency conversions and another for exchange rates.

Gaming machine 1400 also includes modified bill scanning firmware or software 1410 capable of scanning and recognizing non-native bills for which the gaming machine has been configured. As described above, in one embodiment this is part of the machine's bill validator firmware.

As described above, a non-native cash in amount may be converted to cashable or restricted credits using different effective or actual exchange rates. In one embodiment, a restricted credit conversion component 1412 contains logic and data needed for converting a cash in amount to native restricted credits, for example, using the formulas described above. Similarly, a cashable credit conversion component 1414 contains logic and other data needed to convert a cash in amount to cashable credits. In another embodiment, these components may be implemented as a single component containing all the formulas, conversion rates, rules and so on needed to convert an amount to either type of credit or a combination of both. Related to these components is a logic component 1416 storing logic for calculating a non-converted (or returnable) amount after a conversion value is derived as described in the figures above. Logic module 1416 may also store logic needed to calculate the lost or left-over amount that may stay on machine 1400 or may be credited to the player if player tracking is used. In another embodiment, these calculations may be performed by separate logic modules.

Gaming machine 1400 also has a storage area 1402 that may be comprised of non-volatile memory and other types of memory as described above in FIG. 1. There is a wide variety of data that may be stored on a gaming machine of which some that are relevant to the present invention are shown in FIG. 14. These may include exchange rate table or tables 1418 as described in FIG. 8. In one embodiment, this may include one table containing exchange rates for converting one non-native monetary type to a native amount. Monetary type table or tables 1420, as shown in FIG. 5, may also be stored on gaming machine 1402. In another embodiment, both types of tables are stored in a single non-volatile storage area where the monetary type tables are stored with the exchange rate tables. For example, the monetary type table for Japan's currency may be stored with or linked to the exchange rate table containing rates for converting the yen to a native monetary type, for example, the Canadian dollar or the U.S. dollar. Also shown are currency conversion rules, regulations, policies, safeguards, and the like at 1422. These may contain all or some of the conditions described above with respect to detecting and preventing illegal or undesirable currency conversions at gaming machines. At least a portion of these rules may address issues such as money laundering which would involve federal and stated statutes in addition to GCB regulations. Memory area 1402 may also contain loss limit rules 1424 which contains rules and policies relating to minimizing financial harm to a player. In another embodiment, rules 1424 may be stored with other loss limit data and rules stored on the gaming machine or on the gaming network. In one embodiment, gaming machine 1400 also includes a currency display module 1426 that contains software for displaying currency-specific icons, symbols, monetary units (e.g., $, £, €, etc., placement of commas, decimal points, etc.), and any other text (e.g., in the non-native language) and images needed to convey to a player that the gaming machine can accept the foreign currency and, once a conversion takes place, any game-related text and images in the non-native language to enable game play. In one embodiment, the majority of the text, images, symbols, and the like will be conveyed to the player in the native language when possible, but some circumstances may dictate that non-native language text, images, symbols, and the like be used.

Figure 15:
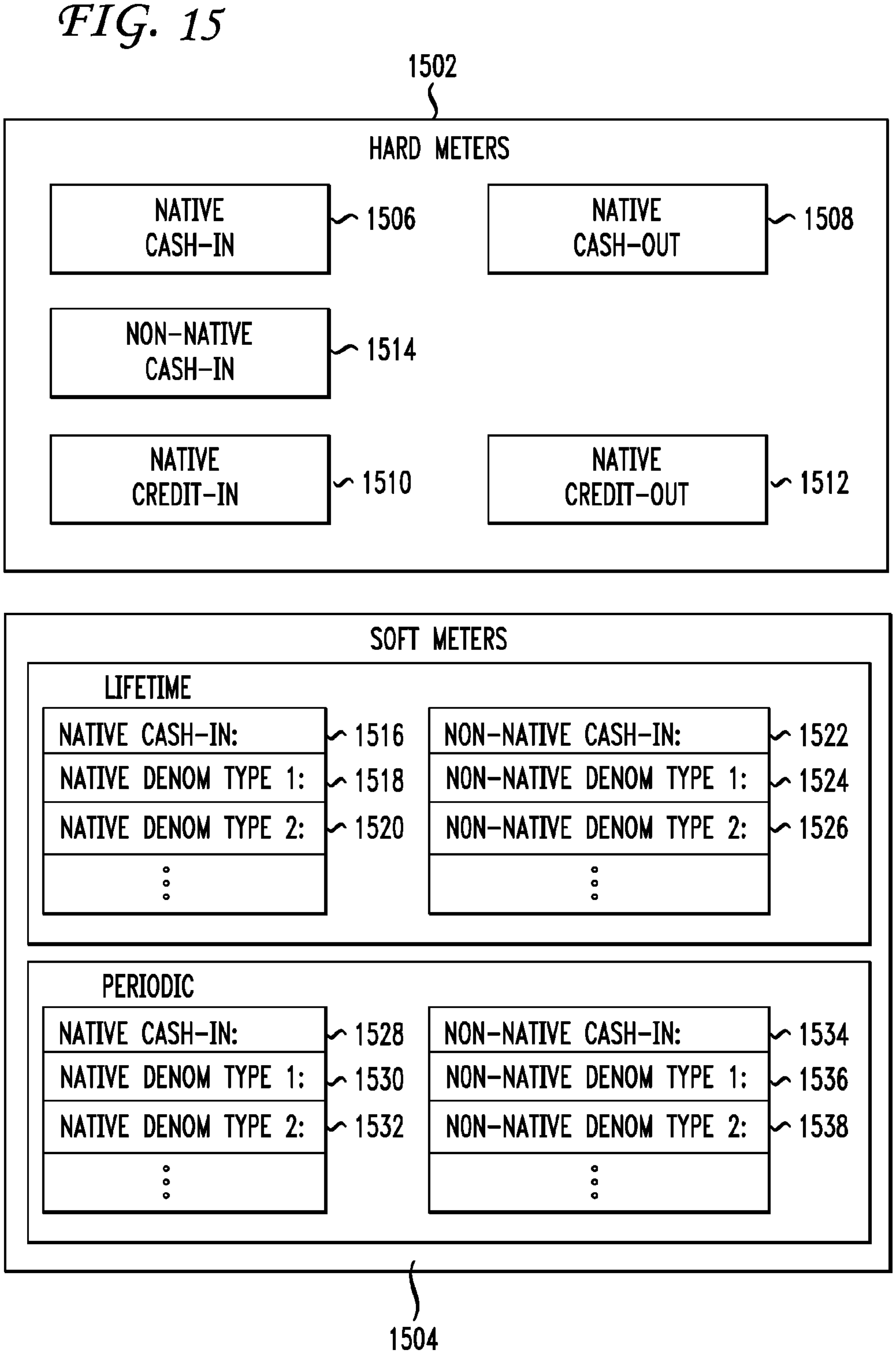
FIG. 15 is a logical block diagram of some of the various meters that may be used in one embodiment of the gaming machine of the present invention.

FIG. 15 is a logical block diagram of some of the various meters that may be used in one embodiment of the gaming machine of the present invention. It shows in greater detail the components of meters module 1404 shown in FIG. 14. Meters in the gaming machine are separated into hard (or hardware) meters 1502 and soft (or software) meters 1504. Included in hard meters 1502 are native cash in meter 1506 and native cash out meter 1508. Also included are native credit in meter 1510 and native credit out meter 1512. Maintaining these meters in the native currency is necessary to verify paytable payback percentages for the gaming machine, among other functions. Cash in meter 1506 is incremented based on the pre-set denomination, for example, one dollar or 25 cents. Credit in meter 1510 is incremented according to credits. Thus, if the denomination for the cash in meter is $1 (thus, a value of 30 means $30 has been inserted into the machine for wager game play) and one credit is 25 cents, then a cash in meter increment of 1 will correspond to a credit in meter increment of 4. Also included in hard meters 1502 is a non-native cash in meter 1514. This meter is incremented when foreign currency is inserted into the machine. It also has a set denomination in the non-native monetary type that dictates how the meter is incremented. Once the amount has been converted to native currency type, native cash in meter 1506 and native credit in meter 1510 are incremented accordingly. These meters are incremented to ensure that the payback percentage of the machine may still be calculated using the native monetary type as required. In one embodiment, cash out and credit out amounts are calculated in the native monetary type and therefore a non-native cash out meter is not needed. In other embodiments, there may be a non-native cash out and credit out meters to enable payout of wins in a non-native currency.

Soft meters 1504 includes lifetime or main meters 1516, 1518, 1520 etc. and periodic meters 1528, 1530, 1532 etc. These meters are software implementations of hard meters 1502 stored in non-volatile memory and include additional meters as described below. One set of lifetime meters are for native monetary type and include native cash in meter 1516. These meters are not intended to be reset and are analogous to the hard meters described above that provides the total cash in amount. Additional meters for all or some of the native denominations, such as meters 1518, 1520, etc. are also included. These provides counts of the number of bills of particular denominations received by the machine, that is, the total number of $5 bills, $10 bills, and so on. In one embodiment, there is also a non-native cash in meter 1522 and individual non-native denomination type meters 1524, 1526, and so on. This is similar to native denomination meters 1518, 1520. These meters keep a count of the number of foreign bills inserted into the machine. Lifetime soft meters also include meters for native credit in, native cash out, and native credit out (not shown in FIG. 15).

Another type of soft meters is periodic meters which, in contrast to the lifetime meters, can be reset as needed by the gaming operator, for example after each accounting period (monthly, quarterly, etc.) or when the machine is being re-configured. Shown are period native cash in meters 1528, 1530, 1532, and so on, as described above for the lifetime meters. These meters keep track of the amount of native cash in and the specific denominations of the bills being inserted. Similarly, non-native cash in meters include meter 1534 for keeping track of the total foreign currency inserted into the machine during a specific time period and meters 1536, 1538, etc. for keeping track of the number of bills of specific denominations in the non-native type inserted into the machine. All or some of the soft meters described above and other meters, such as cash out and credit out meters, may be used for a soft count by the gaming operator to ensure that the amount of cash inserted into the machine for actual game play as electronically reported by the meters to the gaming network accounting system matches the total cash physically removed from the machine, including the specific number of bills for each denomination. In other embodiments, there are additional non-native hard and soft meters similar to the ones described above for each foreign currency accepted by the machine. In other embodiments, the gaming machine also includes non-native coin in meters (not shown in FIG. 15). Thus, if a gaming operator wants to change the non-native monetary type of a gaming machine, only changes to the soft and hard non-native meters would be affected; the native meters would not have to be altered.

Figure 16:
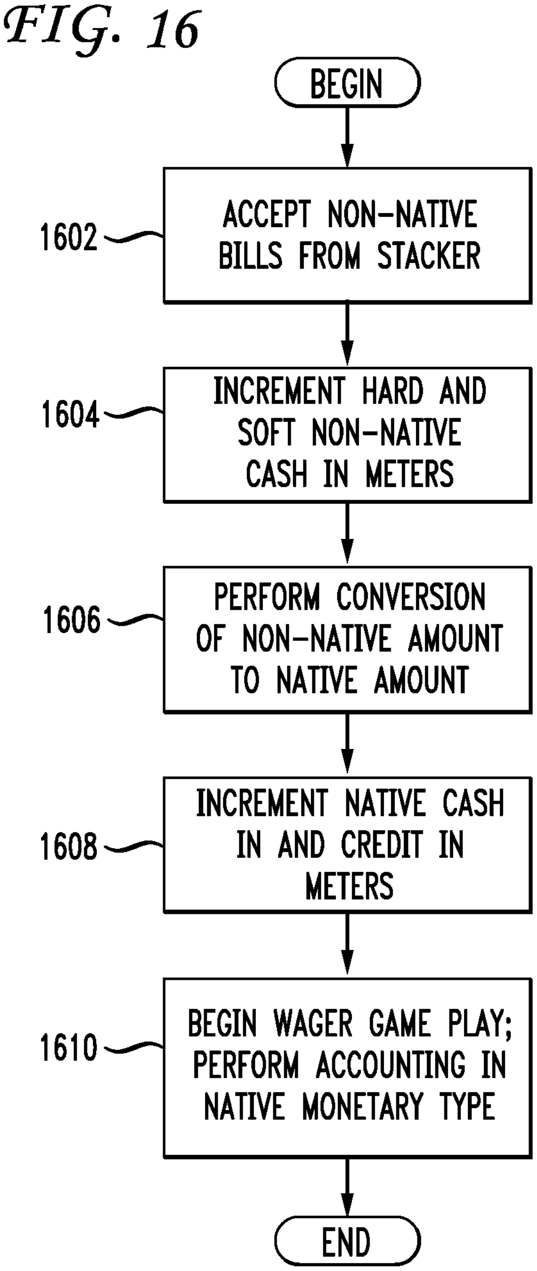
FIG. 16 is a flow diagram of a process of updating the various native and non-native meters in a gaming machine in accordance with one embodiment of the present invention.

FIG. 16 is a flow diagram of a process of updating the various native and non-native meters in a gaming machine in accordance with one embodiment of the present invention. At step 1602 the non-native bills are accepted by the bill validator and stacked. At step 1604 hard non-native cash in meter 1514 is incremented according to the value of the non-native bills accepted by the machine. In another embodiment, non-native coins are also accepted and meter 1514 is incremented accordingly. In addition, the soft meters for non-native cash in and the specific non-native denomination meters are incremented. For example, if a player inserts two Canadian $10 bills, and five Canadian $1 bills (in a U.S. native monetary type gaming machine) and the amount is used for game play, the hard non-native cash in meter is incremented by Canadian $25, the soft non-native lifetime and periodic meters are incremented by the same amount, and the non-native $1 bill meter is incremented five times and the non-native $10 bill meter is incremented twice. In another embodiment, the gaming machine only has periodic non-native denomination-specific meters and no analogous lifetime meters. In this embodiment, there is less non-volatile memory used which is generally preferable in gaming machine design. At step 1606 the non-native amount is converted to a native amount using the processes described above. In one embodiment, the non-native amount is not used in any internal accounting and game operations in the gaming machine. At step 1608 the native hard and soft cash in and credit in meters are incremented based on the converted amount and assuming that an immediate cash out has not been requested. At step 1610, game play begins and all accounting in the gaming machine is performed in the native monetary type. In one embodiment, all cash outs are paid in the native monetary type.

As described above, multiple currency gaming machine of the present invention performs currency conversions from non-native currency to a native currency. In one embodiment, the native currency is the currency of the jurisdiction in which the gaming machine operates. This allows a local gaming authority, such as a gaming control board, to regulate the operation of the gaming machine which requires that calculations be made in the currency of that jurisdiction. The non-native currency is not the currency of the jurisdiction in which the game operates. However, it is possible that the jurisdiction of the gaming machine has more than one local or native monetary type, although gaming regulations will likely fall under only one of the native currencies and that currency would be the native currency of the gaming machine. For example, in one embodiment, the gaming machine's hold calculation is performed using only the native currency and native meters. The exchange rate of the non-native currency and related calculations, such as returned amounts and lost amounts, do not affect the hold calculations of the machine, which are performed using the values from the native meters.

In another embodiment, cash conversion is performed on a kiosk or non-gaming machine as part of a gaming network but not capable of wager gaming. A gaming operator may want such a machine in the casino to allow players to convert a non-native currency amount to a ticket containing cashable or restricted credits or a combination of both for game play on one of the operator's other gaming machines. Such a machine need not be a gaming machine capable of cash conversion as described above but rather a regular machine that only accepts cash or tickets in the native currency. In this manner, some of the benefits of converting a non-native amount to credits are available to players without having to use a cash conversion gaming machine. In one embodiment, non-gaming kiosk converts non-native cash amounts to native cashable or restricted credits in the form of cashless tickets or other monetary instrument other than cash in the native monetary type. In this embodiment the gaming operator wants to encourage wager game play at the operator's casino rather than offering simply a cash conversion service. Once the cash has been converted, the player must engage in wager game play on a gaming machine (either a cash conversion or regular machine) to redeem the value of the ticket or cashless instrument. In one embodiment, a ticket containing cashable credits dispensed from the kiosk must be redeemed by wager game play and cannot be cashed out for an amount in the native currency. For example, there may be an indicator or flag on a "kiosk" ticket indicating that it was obtained from a cash conversion kiosk and must be used for wager game play. In another embodiment a ticket obtained from a cash conversion kiosk may always have at least a portion of the credits from the converted amount in the form of restricted credits which must be played at a gaming machine and the remainder of the credits may be cashable credits that may be cashed into the native currency without any restrictions. This embodiment has the same desired goal of discouraging use of the kiosk simply for currency conversion.

In one embodiment, the cash conversion kiosk converts non-native currency to native restricted credits at a higher exchange rate, in a manner similar or identical to the cash conversion gaming machine. In another embodiment, a higher conversion rate (i.e., one more favorable to the player) may be used when converting to restricted credits which can only be used under specific circumstances. This may include credits that can only be used on certain gaming machines, with certain games, on machines in designated areas, for wagers in a particular denomination, for wagers made during certain times and days, or for certain wager amounts. Other factors may also be used for use of this type of restricted credits. The same concept and processes may be applied to cash conversion gaming machines as described above and are not limited to restricted credits obtained at cash conversion kiosks. In another embodiment, the kiosk tracks the lost amounts as described above for each player (having a player tracking account), for each kiosk, or for the entire or parts of the gaming network in a manner similar to that described above for cash conversion gaming machines.

Figure 17:
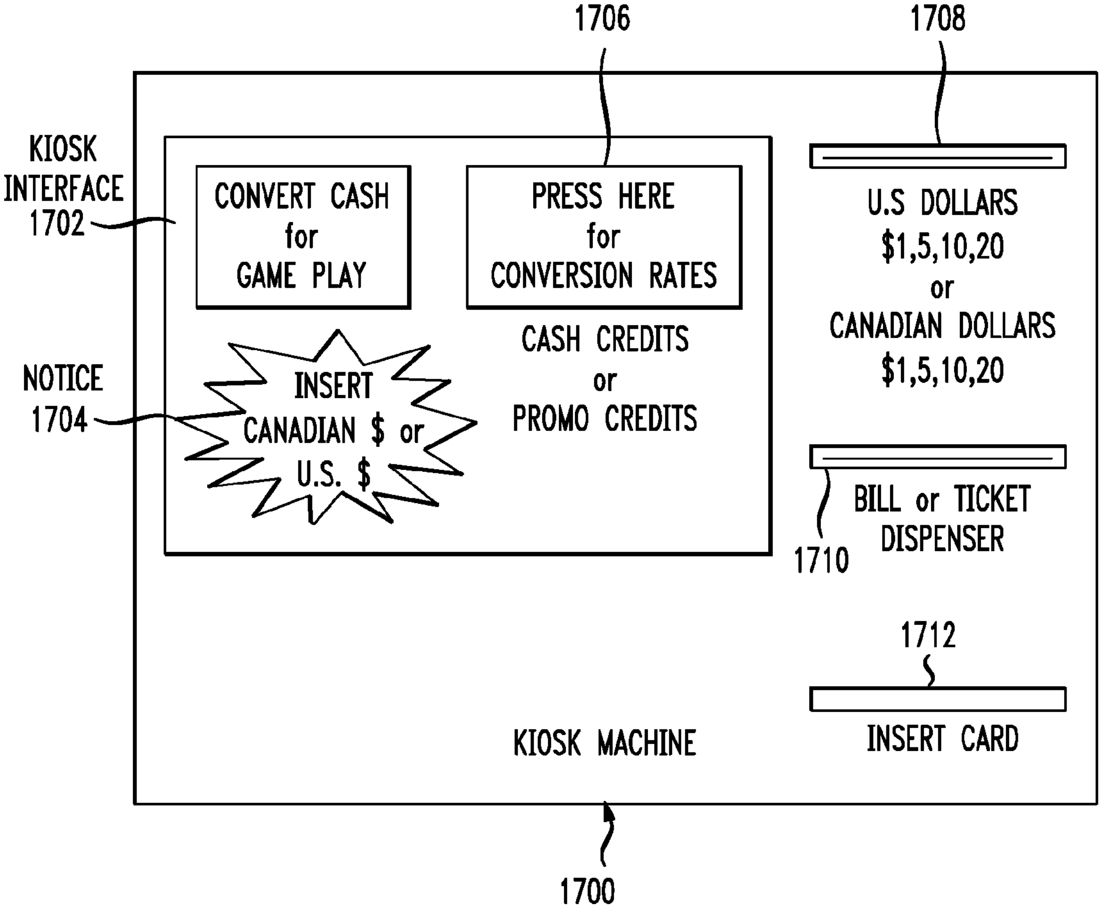
FIG. 17 is a block diagram of a cash conversion kiosk for use in a gaming network from the vantage of a player in accordance with one embodiment of the present invention.

FIG. 17 is a block diagram of a cash conversion kiosk for use in a gaming network from the vantage of a player in accordance with one embodiment of the present invention. A kiosk 1700 has a kiosk interface 1702 that displays various types of information to a player. Notice 1704, for example, informs the player that he or she can insert a native or non-native currency, such as Canadian or U.S. dollars. If native currency is inserted, no conversion is performed and a ticket without any restrictions attached (namely those associated with a cash conversion-related ticket) is issued to the player. Display area 1706 allows a player to obtain information on the conversion rates as is described with respect to area 1306 in FIG. 13. The player can view the different rates for restricted, special restricted, and cashable credits, and any other types of credits that may be available. Bill insert area 1708 is capable of accepting currency in the native or non-native monetary as described above in FIG. 13. Bill/Ticket dispenser area 1710 dispenses a ticket to the player according to the conversion. In some embodiments, one or more bills in the native or non-native currency may be returned to the player, for example, if a bill having an invalid denomination was inserted or a certain amount of the inserted non-native amount could not be converted. In other embodiments kiosk 1700 may also have a coin hopper (not shown) for dispensing non-native or native coins.

In one embodiment kiosk 1700 also has a card insert area 1712 that is capable of accepting a player tracking card or other type of card, such as a credit or debit card. If a player tracking card is inserted, an exchange rate for converting the currency may be used based on player information. This may also be the case with cash conversion gaming machines described above capable of accepting a player tracking card. In other embodiments, there may be a keypad (not shown) that allows a player to insert an account number, pin number, and the like, related to the player tracking account. In such embodiments, kiosk 1700 or gaming machine 1300 is connected to a gaming network or at least to a back-end player tracking system. A gaming operator may adjust information on the conversion rates used and displayed to the player based on the player tracking account. In a simple example, if it is determined that a player has wager a large amount recently or is in some way a high value player to the casino, a better exchange rate may be offered to the player or the credits issued to the player may have fewer than the normal restrictions. And, as described above, a player tracking system may be used to keep track of lost amounts for a particular player so that these amounts inure to the benefit of the player over time.

Although the foregoing invention has been described in some detail for purposes of clarity of understanding, it will be apparent that certain changes and modifications may be practiced within the scope of the appended claims. It should be noted that there are many alternative ways of implementing both the method and apparatus of the present invention. For instance, while the gaming machines of this invention have been depicted as having top box mounted on top of the main gaming machine cabinet, the use of gaming devices in accordance with this invention is not so limited. Various alternative embodiments of the present invention may be practiced with stand-alone gaming machines or gaming machines linked by a host system. Also, while a gaming machine capable of accepting two different currencies has been described, the present invention includes machines that can accept more than one non-native currency. The methods and systems described above may also be implemented in a peer gaming network where components, modules, data and so on are stored in a peer gaming machine for use by other machines in the peer network. Accordingly, the present embodiments are to be considered as illustrative and not restrictive, and the invention is not to be limited to the details given herein, but may be modified within the scope and equivalents of the appended claims.

What is claimed is:

1. A gaming machine, comprising:

a memory;

an input device configured to receive a first currency value of a non-native currency type, the non-native currency type convertible into a native currency type and the native currency type being a type of currency used by the gaming machine for play of a wager-based game;

one or more logic modules configured to:

retrieve, from the memory, a first left-over amount that is a residual currency value of the non-native currency type from a previous currency conversion transaction that was not converted into the native currency type and that was not returned by the gaming machine, determine a total non-native currency value, the total non-native currency value including the first currency value and the first left-over amount, convert the total non-native currency value from the non-native currency type into the native currency type, thereby resulting in a total native currency value of the native currency type to use to play the wager-based game, the total native currency value being an amount of the total non-native currency value that was capable of being converted into the native currency type, determine whether there is an unconverted amount, the unconverted amount being an amount of the total non-native currency value that is not converted into the native currency type, and determine a returnable amount and a second left-over amount based on the unconverted amount, the second left-over amount being an amount of the non-native currency type that was not converted into the native currency type and that is not returned by the gaming machine; and an output device configured to provide the returnable amount.

2. The gaming machine of claim 1, wherein the one or more logic modules are further configured to convert the unconverted amount into fractional credits to use to play the wager-based game when it is determined that there is an unconverted amount.

3. The gaming machine of claim 1, wherein the memory stores the second left-over amount.

4. The gaming machine of claim 1, further comprising:

a left-over amount meter configured to store the second left-over amount.

5. The gaming machine of claim 1, further comprising:

a network interface configured to communicate with a host server; and wherein one or more logic modules are configured to send the second left-over amount to the host server via the network interface.

6. The gaming machine of claim 1, wherein the returnable amount is provided in the form of a ticket.

7. The gaming machine of claim 1, wherein the memory stores the exchange rate to convert the total non-native currency value to a total native currency value.

8. The gaming machine of claim 1, wherein the total native currency value is stored on a meter of the gaming machine in at least one form of: cashable credits, restricted credits and a combination of cashable and restricted credits.

9. The gaming machine of claim 1, further comprising:

a scanning mechanism configured to:

scan the first currency value to determine a currency type of the first currency value, wherein the scanning mechanism holds the first currency value in a temporary state; and release the first currency value when it is determined that the gaming machine is configured to process the currency type of the first currency value.

10. A method for a multiple-currency-enabled gaming machine, the method comprising:

receiving, at the gaming machine, a first currency value of a non-native currency type, the non-native currency type convertible into a native currency type and the native currency type being a type of currency used by the gaming machine for play of a wager-based game;

retrieving, from a memory of the gaming machine, a first left-over amount that is a residual currency value of the non-native currency type from a previous currency conversion transaction that was not converted into the native currency type and that was not returned by the gaming machine;

determining, by one or more logic modules of the gaming machine, a total non-native currency value, the total non-native currency value including the first currency value and the first left-over amount;

converting, by one or more logic modules of the am min machine, the total non-native currency value from the non-native currency type into the native currency type, thereby resulting in a total native currency value of the native currency type of the gaming machine for use in playing the wager-based game, the total native currency value being an amount of the total non-native currency value that was capable of being converted into the native currency type;

determining, by one or more logic modules of the gaming machine, whether there is an unconverted amount, the unconverted amount being an amount of the total non-native currency value that is not converted into the native currency type;

determining, by one or more logic modules of the gaming machine, a returnable amount and a second left-over amount based on the unconverted amount, the second left-over amount being an amount of the non-native currency type that was not converted into the native currency type and that is not returned by the gaming machine; and providing, at an output device of the gaming machine, the returnable amount.

11. The method of claim 10, further comprising:

converting, by the gaming machine, the unconverted amount into fractional credits to use to play the wager-based game on the gaming machine when it is determined that there is an unconverted amount.

12. The method of claim of claim 10, further comprising:

storing the unconverted amount to a player tracking account.

13. The method of claim 10, further comprising:

storing the second left-over amount to a player tracking account.

14. One or more non-transitory computer readable media having instructions stored thereon for controlling a gaming machine to:

receive a first currency value of a non-native currency type, the non-native currency type convertible into a native currency type and the native currency type being a type of currency used by the gaming machine for play of a wager-based game;

retrieve a first left-over amount that is a residual currency value of the non-native currency type from a previous currency conversion transaction that was not converted into the native currency type and that was not returned by the gaming machine;

determine a total non-native currency value, the total non-native currency value including the first currency value and the first left-over amount;

convert the total non-native currency value from the non-native currency type into the native currency type, thereby resulting in a total native currency value, of the native currency type of the gaming machine to use to play the wager-based game, the total native currency value being an amount of the total non-native currency value that was capable of being converted into the native currency type;

determine whether there is an unconverted amount, the unconverted amount being an amount of the total non-native currency value that is not converted into the native currency type;

determine a returnable amount and a second left-over amount based on the unconverted amount, the second left-over amount being an amount of the non-native currency type that was not converted into the native currency type and that is not returned by the gaming machine; and provide, at an output device of the gaming machine, the returnable amount.

* * * * *